US008588171B2

(12) United States Patent  
Fukuoka et al.

(10) Patent No.: US 8,588,171 B2  
(45) Date of Patent: Nov. 19, 2013

(54) RADIO COMMUNICATION DEVICE AND PILOT ARRANGEMENT METHOD

(75) Inventors: Masaru Fukuoka, Ishikawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 925 days.

(21) Appl. No.: 12/442,492

(22) PCT Filed: Sep. 25, 2007

(86) PCT No.: PCT/JP2007/068543  
§ 371 (c)(1),  
(2), (4) Date: Mar. 23, 2009

(87) PCT Pub. No.: WO2008/041546  
PCT Pub. Date: Apr. 10, 2008

(65) Prior Publication Data  
US 2010/0027501 A1 Feb. 4, 2010

(30) Foreign Application Priority Data  
Sep. 25, 2006 (JP) .................................. 2006-259633

(51) Int. Cl.  
*H04W 4/00* (2009.01)

(52) U.S. Cl.  
USPC ......................................................... 370/330

(58) Field of Classification Search  
None  
See application file for complete search history.

(56) References Cited

U.S. PATENT DOCUMENTS

| 6,157,842 | A * | 12/2000 | Karlsson et al. | 455/456.2 |
| 7,149,190 | B1 * | 12/2006 | Li et al. | 370/278 |
| 7,639,660 | B2 * | 12/2009 | Kim et al. | 370/343 |
| 7,710,918 | B2 * | 5/2010 | Jung et al. | 370/329 |
| 7,873,055 | B2 * | 1/2011 | Li et al. | 370/395.4 |
| 7,995,527 | B2 * | 8/2011 | Li et al. | 370/329 |
| 2002/0136187 | A1 * | 9/2002 | Aoyama et al. | 370/342 |
| 2004/0095904 | A1 * | 5/2004 | Laroia et al. | 370/329 |
| 2004/0246886 | A1 * | 12/2004 | Mege et al. | 370/203 |
| 2005/0036564 | A1 * | 2/2005 | Peter et al. | 375/260 |
| 2005/0152480 | A1 * | 7/2005 | Chang et al. | 375/343 |

(Continued)

FOREIGN PATENT DOCUMENTS

| EP | 1988729 A1 * | 11/2008 |
| JP | 2006-507753 | 3/2006 |

(Continued)

OTHER PUBLICATIONS

International Search Report dated Dec. 25, 2007.

(Continued)

*Primary Examiner* — Bunjob Jaroenchonwanit  
(74) *Attorney, Agent, or Firm* — Dickinson Wright PLLC

(57) ABSTRACT

Provided is a radio communication device capable of reducing the number of pilots while maintaining a channel estimation accuracy. The radio communication device includes: a unicast pilot generation unit (105) which generates a unicast pilot sequence and outputs it to an arrangement unit (106); and an arrangement unit (106) arranges unicast data, multicast data, a unicast pilot sequence, and a multicast pilot sequence at a position on the two-dimensional plane formed by a frequency axis and a time axis for output to an IFFT (Inverse Fast Fourier Transform) unit (107). Here, the arrangement unit (106) does not arrange pilots of the multicast pilot sequence at a time when the single frequency is different from the position where identical pilots are arranged between sectors among the respective pilots of the unicast pilot sequence in one sub frame.

6 Claims, 22 Drawing Sheets

(56) References Cited

U.S. PATENT DOCUMENTS

| | | | |
|---|---|---|---|
| 2005/0195763 A1* | 9/2005 | Kadous et al. | 370/328 |
| 2005/0281290 A1* | 12/2005 | Khandekar et al. | 370/500 |
| 2005/0286408 A1* | 12/2005 | Jin et al. | 370/208 |
| 2006/0114812 A1 | 6/2006 | Kim | |
| 2006/0187876 A1* | 8/2006 | Schmidl et al. | 370/328 |
| 2006/0198294 A1* | 9/2006 | Gerlach | 370/208 |
| 2006/0198295 A1* | 9/2006 | Gerlach | 370/208 |
| 2006/0274691 A1* | 12/2006 | Naguib et al. | 370/330 |
| 2006/0285483 A1* | 12/2006 | Khan | 370/208 |
| 2007/0070944 A1* | 3/2007 | Rinne et al. | 370/329 |
| 2007/0087749 A1* | 4/2007 | Ionescu et al. | 455/436 |
| 2007/0098053 A1* | 5/2007 | Rinne et al. | 375/149 |
| 2007/0133462 A1* | 6/2007 | Guey | 370/330 |
| 2007/0165566 A1* | 7/2007 | Khan et al. | 370/329 |
| 2007/0201398 A1* | 8/2007 | Yang et al. | 370/329 |
| 2007/0287462 A1* | 12/2007 | Gorokhov et al. | 455/439 |
| 2008/0062857 A1* | 3/2008 | Monogioudis et al. | 370/208 |
| 2008/0089286 A1* | 4/2008 | Malladi et al. | 370/330 |
| 2008/0096574 A1* | 4/2008 | Khandekar et al. | 455/452.2 |
| 2008/0212555 A1* | 9/2008 | Kim et al. | 370/344 |
| 2008/0232504 A1* | 9/2008 | Ma et al. | 375/267 |
| 2009/0004971 A1* | 1/2009 | Dateki et al. | 455/62 |
| 2009/0016461 A1* | 1/2009 | Jitsukawa et al. | 375/267 |
| 2009/0052381 A1* | 2/2009 | Gorokhov et al. | 370/329 |
| 2009/0067534 A1* | 3/2009 | Kwak et al. | 375/267 |
| 2009/0175228 A1* | 7/2009 | Kimura et al. | 370/329 |
| 2009/0201876 A1* | 8/2009 | Morimoto et al. | 370/330 |
| 2009/0296563 A1* | 12/2009 | Kishiyama et al. | 370/210 |
| 2009/0316614 A1* | 12/2009 | Kim et al. | 370/312 |
| 2010/0208664 A1* | 8/2010 | Nishio et al. | 370/329 |
| 2011/0116411 A1* | 5/2011 | Hwang et al. | 370/252 |
| 2011/0122838 A1* | 5/2011 | Akkarakaran et al. | 370/330 |
| 2012/0014280 A1* | 1/2012 | Li et al. | 370/252 |
| 2012/0051457 A1* | 3/2012 | Ma et al. | 375/295 |

FOREIGN PATENT DOCUMENTS

| | | |
|---|---|---|
| JP | 2006-246456 | 9/2006 |
| WO | 2007/108080 | 9/2007 |
| WO | 2007/129620 | 11/2007 |

OTHER PUBLICATIONS

Akihito Morimoto, et al., "OFDM o Mochiiru Evolved UTRA Kudari Link ni Okeru TDM Base no MBMS ni Tekishita Pilot Channel Kosei no Kento," IEICE Technical Report, vol. 106, No. 223, The Institute of Electronics, Information and Communication Engineers, Aug. 24, 2006, pp. 55-60.

3GPP TSG-RAN WG1 Meeting #44bis, R1-060779, Athens, Greece, Mar. 27-31, 2006, Source: NTT DoCoMo, et al., Title: Investigations on Pilot Channel Structure for MBMS in E-UTRA Downlink, Agenda Item: 10.1.2, Document for: Discussion and Decision, Mar. 2006, pp. 1-14.

3GPP TSG RAN WG1 Meeting #46, R1-062099, Tallinn, Estonia, Aug. 28-Sep. 1, 2006 (Original R1-060300), Source: NTT DoCoMo, Ericsson, Fujitsu, Intel Corporation, KDDI, Mitsubishi Electric, NEC, Panasonic, Qualcomm, Sharp, Toshiba Corporation, Title: Orthogonal Reference Signal Structure for Sectored Beams in E-UTRA Downlink, Agenda Item: 8.4,1, Document for: Discussion and Decision, pp. 1-9.

* cited by examiner $$\text{UNICAST PILOT SEQUENCE 1} \begin{cases} \text{SECTOR 1} \\ \text{SECTOR 2} \\ \text{SECTOR 3} \\ \text{SECTOR 4} \\ \text{SECTOR 5} \\ \text{SECTOR 6} \end{cases} \begin{pmatrix} 1 \\ 1 \\ 1 \\ 1 \\ 1 \\ 1 \end{pmatrix} \quad \begin{matrix} 1 \\ e^{(j4\pi/3)} \\ e^{(j2\pi/3)} \\ e^{(j4\pi/3)} \\ e^{(j2\pi/3)} \\ -1 \end{matrix} \quad \begin{pmatrix} 1 \\ e^{(j2\pi/3)} \\ e^{(j4\pi/3)} \\ e^{(j4\pi/3)} \\ e^{(j2\pi/3)} \\ 1 \end{pmatrix} \quad \begin{pmatrix} 1 \\ 1 \\ 1 \\ -1 \\ -1 \\ -1 \end{pmatrix} \cdots$$

FIG.21

$$\text{UNICAST PILOT SEQUENCE 2} \begin{cases} \text{SECTOR 1} \\ \text{SECTOR 2} \\ \text{SECTOR 3} \\ \text{SECTOR 4} \\ \text{SECTOR 5} \\ \text{SECTOR 6} \end{cases} \begin{pmatrix} 1 \\ 1 \\ 1 \\ 1 \\ 1 \\ 1 \end{pmatrix} \quad \begin{matrix} e^{(j4\pi/3)} \\ e^{(j2\pi/3)} \\ e^{(j4\pi/3)} \\ e^{(j2\pi/3)} \\ -1 \\ 1 \end{matrix} \quad \begin{matrix} e^{(j2\pi/3)} \\ e^{(j4\pi/3)} \\ e^{(j4\pi/3)} \\ e^{(j2\pi/3)} \\ 1 \\ 1 \end{matrix} \quad \begin{pmatrix} 1 \\ 1 \\ -1 \\ -1 \\ -1 \\ 1 \end{pmatrix} \cdots$$

FIG.22

$$\text{UNICAST PILOT SEQUENCE 3} \begin{cases} \text{SECTOR 1} \\ \text{SECTOR 2} \\ \text{SECTOR 3} \\ \text{SECTOR 4} \\ \text{SECTOR 5} \\ \text{SECTOR 6} \end{cases} \begin{pmatrix} 1 \\ 1 \\ 1 \\ 1 \\ 1 \\ 1 \end{pmatrix} \quad \begin{matrix} e^{(j2\pi/3)} \\ e^{(j4\pi/3)} \\ e^{(j2\pi/3)} \\ -1 \\ 1 \\ e^{(j4\pi/3)} \end{matrix} \quad \begin{matrix} e^{(j4\pi/3)} \\ e^{(j4\pi/3)} \\ e^{(j2\pi/3)} \\ 1 \\ 1 \\ e^{(j2\pi/3)} \end{matrix} \quad \begin{pmatrix} 1 \\ -1 \\ -1 \\ -1 \\ 1 \\ 1 \end{pmatrix} \cdots$$

FIG.23

RADIO COMMUNICATION DEVICE AND PILOT ARRANGEMENT METHOD

TECHNICAL FIELD

The present invention relates to a radio communication apparatus and a pilot arrangement method.

BACKGROUND ART

In the field of mobile communication, a variety of information such as image and data in addition to speech becomes transmission targets in recent years. Accompanying this, the demand for reliable and high-speed transmission has increased. However, when high-speed transmission is carried out in mobile communications, the influence of delayed waves due to multipath cannot be ignored, and transmission performance deteriorates due to frequency selective fading.

As one of countermeasure techniques for frequency selective fading, multicarrier communication represented by OFDM (Orthogonal Frequency Division Multiplexing) communication becomes a focus of attention. In multicarrier communication, data is transmitted using a plurality of subcarriers where transmission speed is suppressed to an extent not to cause frequency selective fading. Particularly, in OFDM communication, the frequencies of a plurality of subcarriers where data is arranged are orthogonal to each other, so that it is possible to achieve the maximum frequency efficiency in multicarrier communication schemes and realize multicarrier communication in a relatively simple hardware configuration. Consequently, OFDM communication is attracted attention as a communication method to be employed in cellular scheme mobile communications, and is studied variously. In addition, in OFDM communication, to avoid ISI (Intersymbol Interference) the tail part of an OFDM symbol is attached to the beginning of that OFDM symbol as a cyclic prefix (CP). By this means, for the receiving side, it is possible to avoid ISI as long as the delay time of delay waves stays within the time length of CP (hereinafter "CP length").

Further, studies have been recently conducted for multicast communication. Multicast communication is point-to-multipoint communication, unlike unicast communication, which is point-to-point communication. That is, in multicast communication, one radio communication base station apparatus (hereinafter abbreviated as "base station") transmits the same data (i.e. multicast data) to a plurality of radio communication mobile stations (hereinafter abbreviated as "mobile station") at the same time. By this multicast communication, in mobile communication systems, for example, delivery services of music data and video image data and broadcast services such as television broadcast are realized.

Further, in multicast communication, one base station transmits the same multicast data to a plurality of mobile stations at the same time as described above, and, when one cell is divided into a plurality of sectors, multicast data is the same in a plurality of sectors. Furthermore, when one cell is divided into a plurality of sectors, the same multicast data is transmitted for a plurality of sectors at the same time, and therefore, a mobile station near the cell boundary receives multicast data for a plurality of sectors in a mixed manner.

Here, in cases of using the OFDM scheme in multicast communication, when a mobile station near the sector boundary receives a plurality of identical OFDM symbols, which are transmitted to a plurality of sectors at the same time, within the CP length, the mobile station receives them in a state where these OFDM are combined and received power is amplified. This method of transmitting the same data using the same resources (i.e. the same time and the same frequency) via a plurality of paths is referred to as "SFN (Single Frequency Network) transmission." In SFN transmission, a mobile station is able to receive data without inter-sector interference, so that it is possible to carry out high quality transmission with a lower error rate.

Further, to compensate channel fluctuation (phase fluctuation and amplitude fluctuation) of this combined signal by channel estimation, a channel estimation value of the combined signal is needed. That is, in multicast communication using the OFDM scheme, pilots used to find the channel estimation value need to be transmitted to a plurality of sectors at the same time, as in the case of multicast data. That is, the multicast pilot needs to be a common pilot between a plurality of sectors.

On the other hand, in unicast communication, in cases of dividing one cell into a plurality of sectors, different data (i.e. unicast data) is transmitted to a plurality of sectors. That is, unicast data is unique per sector. Consequently, in unicast communication, as for pilots used to find the channel estimation values, different pilots for unicast data (i.e. unicast pilots) need to be transmitted to a plurality of sectors similar to unicast data. That is, unicast pilots needs to be individual between a plurality of sectors.

Multicast communication adopts a scheme of transmitting information only to specific mobile stations subscribing to services including news groups, and, meanwhile, broadcast communication adopts a scheme of transmitting information to all mobile stations like current TV broadcasting or radio broadcasting. However, multicast communication and broadcast communication are similar in involving point-to-multipoint communication, and, a description using MBMS (Multimedia Broadcast/Multicast Service) which combines multicast communication and broadcast communication, may be given depending on documents. Further, a description may be given using broadcast communication instead of multicast communication, depending on documents.

Here, when one cell is divided into a plurality of sectors, to reduce interference between sectors, an orthogonal pilot channel sequence, which is orthogonal between sectors, is set as a unicast pilot sequence. For example, when one cell is formed with three sectors, that is, sectors 1 to 3, as shown in FIG. 1, a sequence formed with all "1's" (the amount of phase rotation θ=0) is set for sector 1, a sequence by multiplying the sequence of sector 1 and a sequence formed with 1, exp(j2p/3), and exp(j4p/3) . . . (the amount of phase rotation θ=2p/3) is set for sector 2, and, a sequence by multiplying the sequence of sector 1 and a sequence formed with 1, exp(j4p/3), and exp(j2p/3) . . . (the amount of phase rotation θ=4p/3) is set for sector 3. That is, as shown in FIG. 1, unicast pilot sequences of sector 1 to 3, are orthogonal to each other based on one unit (orthogonal sequence unit) formed with three chips in the combination of 1, exp(j2p/3), and exp(j4p/3). Further, each unicast pilot sequence is formed with a plurality of identical orthogonal sequence units. For example, the unicast pilot sequence for sector 1 is a repetition of the orthogonal sequence unit "1, 1, 1," the unicast pilot sequence for sector 2 is a repetition of the orthogonal sequence unit "1, exp(j2p/3), exp(j4p/3)," and the unicast pilot sequence for sector 3 is a repetition of the orthogonal sequence unit "1, exp(j4p/3), exp(j2p/3)."

Then, this unicast pilot arrangement method is studied as shown in FIG. 1 (see Non-patent Document 1). In FIG. 1, for ease of description, a case is shown as one example where one OFDM symbol is formed with subcarriers $f_1$ to $f_{25}$ and where one sub-frame is formed with OFDM symbols #1 to #7. The same applies to the drawings below. In the example shown in FIG. 1, the unicast pilot is arranged to subcarriers $f_1$, $f_7$, $f_{13}$, $f_{19}$ and $f_{25}$ in OFDM symbol #1 and subcarriers $f_4$, $f_{10}$, $f_{16}$ and $f_{22}$ in OFDM symbol #5 in the sectors. That is, for example, the unicast pilot "1" of sector 1, the unicast pilot "1" of sector 2 and the unicast pilot "1" of sector 3 are multiplexed on subcarrier $f_1$ in OFDM symbol #1 on the channel. The unicast pilot "1" of sector 1, the unicast pilot "exp(j2p/3)" of sector 2 and the unicast pilot "exp(j4p/3)" of sector 3 are multiplexed on subcarrier $f_4$ in OFDM symbol #5 on the channel. The unicast pilot "1" of sector 1, the unicast pilot "exp(j4p/3)" of sector 2 and the unicast pilot "exp(j2p/3)" of sector 3 are multiplexed on subcarrier $f_7$ in OFDM symbol #1 on the channel. That is, unicast pilots of a plurality of sectors are multiplexed on the same frequency of the same time. By adopting this arrangement, it is possible to arrange unicast pilots in one sub-frame both in the frequency domain and the time domain all over.

On the other hand, by contrast with this unicast pilot arrangement method, a multicast pilot arrangement method is studied as shown in FIG. 2 (see Non-patent Document 2). As shown in the above description, multicast pilots of a plurality of sectors are required to be arranged to the same frequency of the same time. In the example shown in FIG. 2, in each sector, the multicast pilot is arranged to subcarriers $f_4$, $f_{10}$, $f_{16}$ and $f_{22}$ in OFDM symbol #1 and subcarriers $f_1$, $f_7$, $f_{13}$, $f_{19}$ and $f_{25}$ in OFDM symbol #5. By adopting this arrangement, similar to a unicast pilot, it is possible to arrange multicast pilots in one sub-frame both in the frequency domain and in the time domain all over. Further, conventionally, to sufficiently acquire accuracy of channel estimation for multicast data in all frequencies, as shown in FIG. 2, the number of multicast pilots and the number of unicast pilots arranged in one sub-frame are the same.

Non-patent Document 1: 3GPP TSG RAN WG1 Meeting #46, R1-062099, Tallinn, Estonia, Aug. 28-Sep. 1, 2006, NTT DoCoMo, Ericsson, Fujitsu, Intel Corporation, KDDI, Mitsubishi Electric, NEC, Panasonic, Qualcomm, Sharp, and Toshiba Corporation, "Orthogonal Reference Signal Structure for Sectored Beams in E-UTRA Downlink"

Non-patent Document 2: 3GPP TSG RAN WG1 Meeting #44bis, R1-060779, Athens, Greece, 27-31 Mar. 2006, NTTDoCoMo, Mitsubishi Electric, NEC, Sharp, Toshiba Corporation, "Investigations on Pilot Channel Structure for MBMS in E-UTRA Downlink"

DISCLOSURE OF INVENTION

Problems to be Solved by the Invention

Now, communication resources that can be used in the mobile communication system are limited, and therefore the demand for high speed and large capacity of data transmission further increase today, and resources for data use are requested to be secured as much as possible in the limited resources. To secure as much resources for data use as possible, it is possible to reduce the number of pilots and assign the resources where the pilots have been assigned, to data. However, if the number of pilots is simply decreased, the accuracy of channel estimation is deteriorated.

It is therefore an object of the present invention to provide a radio communication apparatus and pilot arrangement method that maintains the accuracy of channel estimation and reduces the number of pilots.

Means for Solving the Problem

The radio communication apparatus of the present invention adopting the configuration including: an arrangement section that arranges first pilot sequences (i.e. unicast pilot sequences) that vary between a plurality of sectors or between a plurality of cells and second pilot sequences (i.e. multicast pilot sequences) that are shared between the plurality of sectors or between the plurality of cells, to positions on a two dimensional plane defined by a frequency domain and a time domain; and a transmission section that transmits the first pilot sequences and the second pilot sequences arranged on the two dimensional plane, wherein, in one sub-frame, the arrangement section does not arrange pilots of the second pilot sequences to different times of a same frequency as positions where same pilots in the first pilot sequences are arranged in a neighboring sector or in a neighboring cell.

Advantageous Effect of the Invention

According to the present invention, it is possible to maintain the accuracy of channel estimation and reduce the number of pilots.

BRIEF DESCRIPTION OF DRAWINGS

FIG. 21 shows unicast pilot sequence example 1 in pilot arrangement example 8 according to an embodiment of the present invention;

FIG. 22 shows unicast pilot sequence example 2 in pilot arrangement example 8 according to an embodiment of the present invention;

FIG. 23 shows unicast pilot sequence example 3 in pilot arrangement example 8 according to an embodiment of the present invention;

BEST MODE FOR CARRYING OUT THE INVENTION

Now, embodiments of the present invention will be described in detail with reference to the accompanying drawings. Although, in the following description, the OFDM scheme will be explained as a multicarrier communication scheme, the present invention is not limited to the OFDM scheme.

Figure 3:
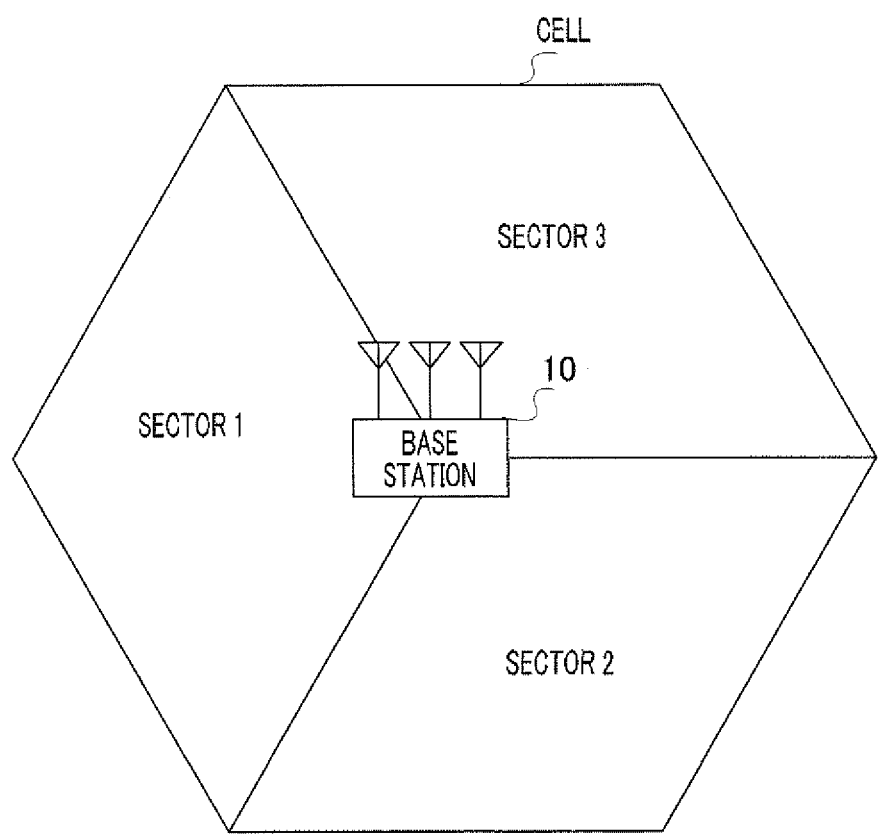
FIG. 3 is a configuration diagram of the mobile communication system (three-sector configuration), according to an embodiment of the present invention.

First, FIG. 3 shows the mobile communication system according to the present embodiment. Here, a case will be shown as an example where one cell is divided into three sectors, that is, sectors 1 to 3. Further, sectors 1 to 3 are neighboring each other. Base station 10 has three antennas for each sector, and transmits signals to each sector from each antenna.

Figure 4:
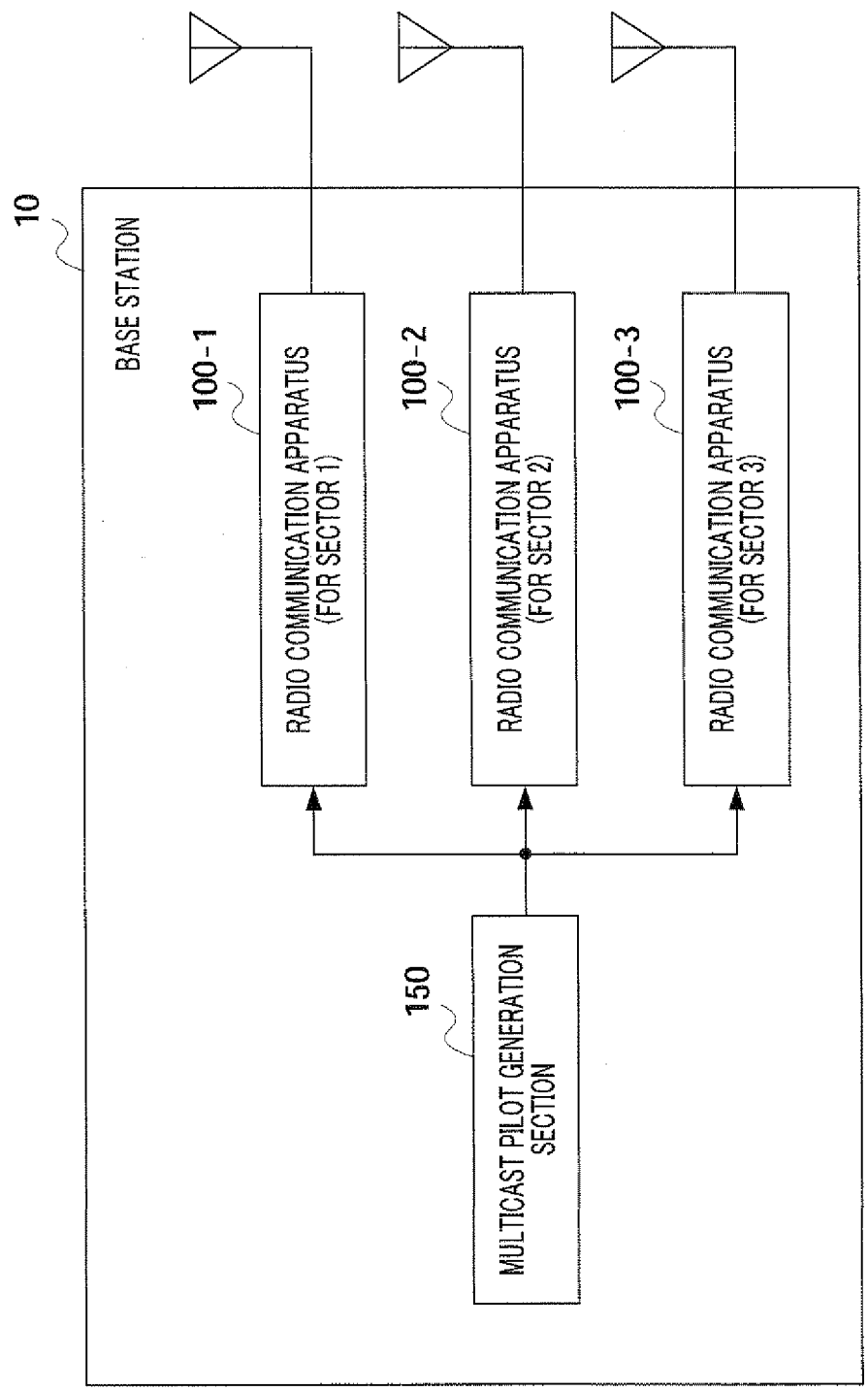
FIG. 4 is a block diagram of the base station according to an embodiment of the present invention.

Next, FIG. 4 shows the configuration of base station 10 according to the present embodiment. Base station 10 has radio communication apparatuses 100-1 to 100-3 for sectors 1 to 3, respectively. Further, base station 10 has multicast pilot generation section 150 that is common between radio communication apparatuses 100-1 to 100-3, that is, common between sectors 1 to 3. Multicast pilot generation section 150 generates a multicast pilot sequence, that is, a pilot sequence that is common between sectors 1 to 3, and output the sequence to radio communication apparatuses 100-1 to 100-3.

Figure 5:
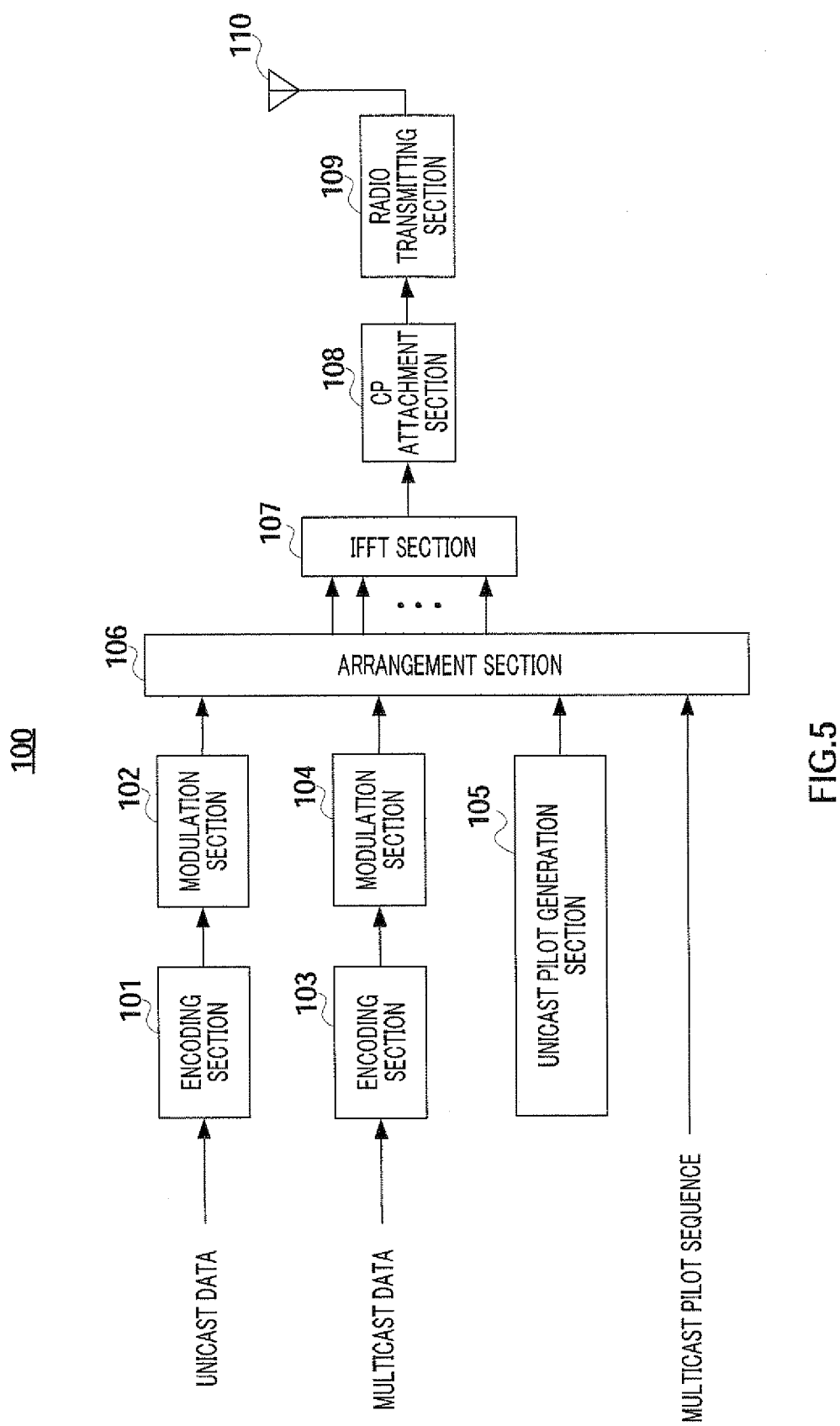
FIG. 5 is a block diagram of the radio communication apparatus according to an embodiment of the present invention.

FIG. 5 shows the configuration of each radio communication apparatus. In the present embodiment, radio communication apparatuses 100-1 to 100-3 shown in FIG. 4 each adopt the configuration shown in FIG. 5.

In radio communication apparatus 100, encoding section 101 encodes unicast data, and outputs the unicast data to modulation section 102.

Modulation section 102 modulates the unicast data after encoding, and outputs the modulated data to arrangement section 106.

Encoding section 103 encodes multicast data, and outputs the multicast data to modulation section 104.

Modulation section 104 modulates the multicast data after encoding, and outputs the modulated data to arrangement section 106.

Unicast pilot generation section 105 generates a unicast pilot sequence, that is, generates a pilot sequence varying between sector 1, sector 2 and sector 3, and outputs the sequence to arrangement section 106. For example, when radio communication apparatus 100 is radio communication apparatus 100-1 for sector 1, unicast pilot generation section 105 generates a unicast pilot sequence formed with unicast pilots "1, 1, 1, . . . ." Further, when radio communication apparatus 100 is radio communication apparatus 100-2 for sector 2, unicast pilot generation section 105 generates a unicast pilot sequence formed with unicast pilots "1, exp(j2p/3), exp(j4p/3), . . . ." Further, when radio communication apparatus 100 is radio communication apparatus 100-3 for sector 3, unicast pilot generation section 105 generates a unicast pilot sequence formed with unicast pilots "1, exp(j4p/3), exp(j2p/3), . . . ."

Further, arrangement section 106 receives a multicast pilot sequence as input from multicast pilot generation section 150 (FIG. 4).

Arrangement section 106 arranges the unicast data, the multicast data, the unicast pilot sequence, and the multicast pilot sequence to the positions on a two-dimensional plane defined by the frequency domain and the time domain, and outputs them to IFFT (Inverse Fast Fourier Transform) section 107. The frequency domain corresponds to a plurality of subcarriers forming one OFDM symbol, and the time domain corresponds to a plurality of OFDM symbols transmitted in order. That is, arrangement section 106 arranges the unicast data, the multicast data, the unicast pilot sequence, and the multicast pilot sequence to a plurality of subcarriers in a plurality of OFDM symbols. Arrangement processing in arrangement section 106 will be described later in detail.

IFFT section 107 performs an IFFT over a plurality of subcarriers where the unicast data, the multicast data, the unicast pilot sequence, and the multicast pilot sequence are arranged and converts them to a time domain signal, to generate an OFDM symbol of a multicarrier signal.

CP attachment section 108 attaches the same signal as the tail part of an OFDM symbol, to the beginning of that OFDM symbol to provide a CP.

Figure 6:
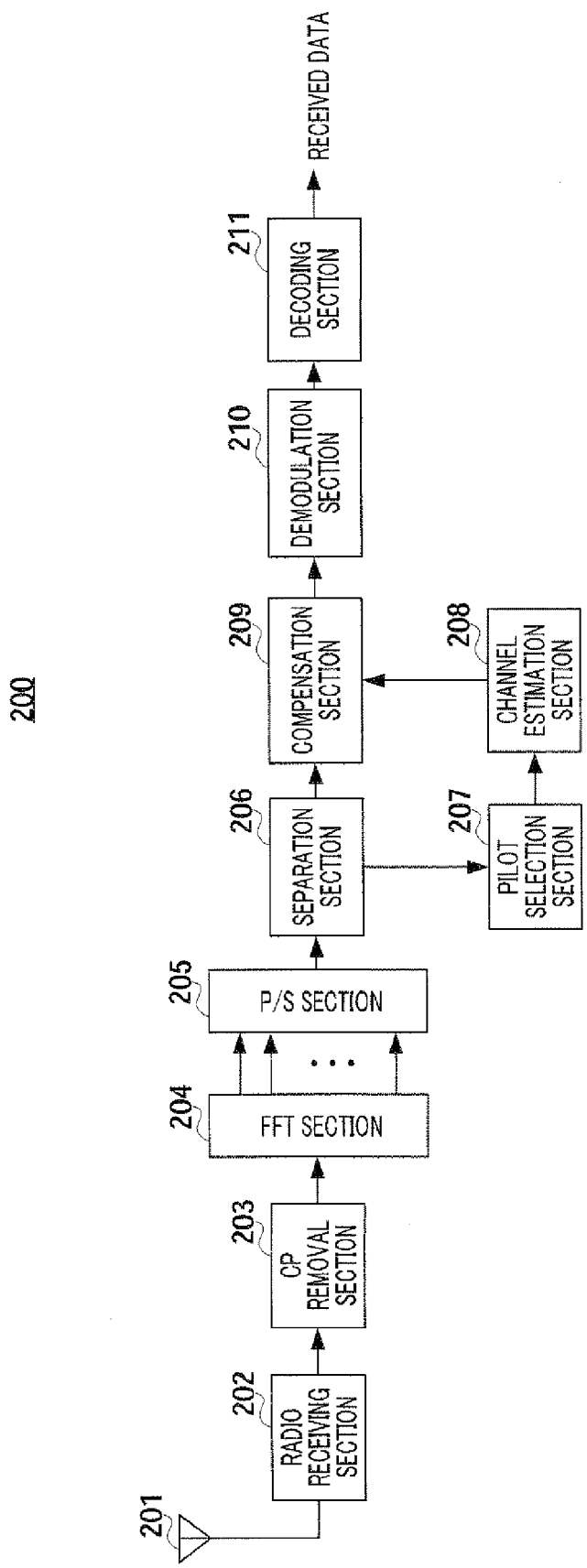
FIG. 6 is a block diagram of the mobile station according to an embodiment of the present invention.

Radio transmitting section 109 performs transmission processing including D/A conversion, amplification and up-conversion, on the OFDM symbol with an attachment of a CP, and transmits the OFDM symbol after transmission processing from antenna 110 to mobile station 200 (FIG. 6). That is, transmitting section 109 transmits the unicast data, the multicast data, the unicast pilot sequence, and the multicast pilot sequence arranged on a two-dimensional plane defined by the frequency domain and the time domain.

Next, mobile station 200 according to the present embodiment will be explained. FIG. 6 shows the configuration of mobile station 200 according to the present embodiment.

In mobile station 200, radio receiving section 202 receives an OFDM symbol via antenna 201 and performs receiving processing including down-conversion and A/D conversion on the received OFDM symbol and outputs it to CP removal section 203.

CP removal section 203 removes the CP attached to the OFDM symbol from the OFDM symbol after receiving processing, and outputs the OFDM symbol without a CP to FFT (Fast Fourier Transform) section 204.

FFT section 204 performs an FFT on the OFDM symbol inputted from CP removal section 203, to convert it to the frequency domain signal, and acquires unicast data, multicast data, unicast pilots or multicast pilots, and outputs them in the number of subcarriers in parallel to P/S section 205.

P/S section 205 converts the unicast data, the multicast data, the unicast pilots or the multicast pilots inputted in parallel from FFT section 204 to serial, and outputs it to separation section 206.

Separation section 206 separates the data and the pilots, and outputs the unicast data and the multicast data to compensation section 209 and outputs the unicast pilots and the multicast pilots to pilot selection section 207.

Pilot selection section 207 selects the pilot depending on a type of data where channel estimation is performed. When the unicast data is outputted from separation section 206 to compensation section 209, pilot selection section 207 selects the unicast pilot and outputs it to channel estimation section 208, and, when the multicast data is outputted from separation section 206 to compensation section 209, pilot selection section 207 selects the multicast pilot and outputs it to channel estimation section 208.

Channel estimation section 208 calculates a channel estimation value using the pilot selected in pilot selection section 207, and outputs the channel estimation value to compensation section 209.

Compensation section 209 compensates channel fluctuation of the unicast data or the multicast data using the channel estimation value calculated in channel estimation value 208, and outputs the compensated data to demodulation section 210. Compensation section 209 compensates the channel fluctuation of each data by multiplying the data by the complex conjugate of the channel estimation value.

Demodulation section 210 demodulates each data inputted from compensation section 209, and outputs each demodulated data to decoding section 211.

Decoding section 211 decodes each data after demodulation. In this way, received data is acquired.

Next, the arrangement processing in arrangement section 106 of radio communication apparatus 100 will be explained in detail with a number of arrangement examples.

Figure 7:
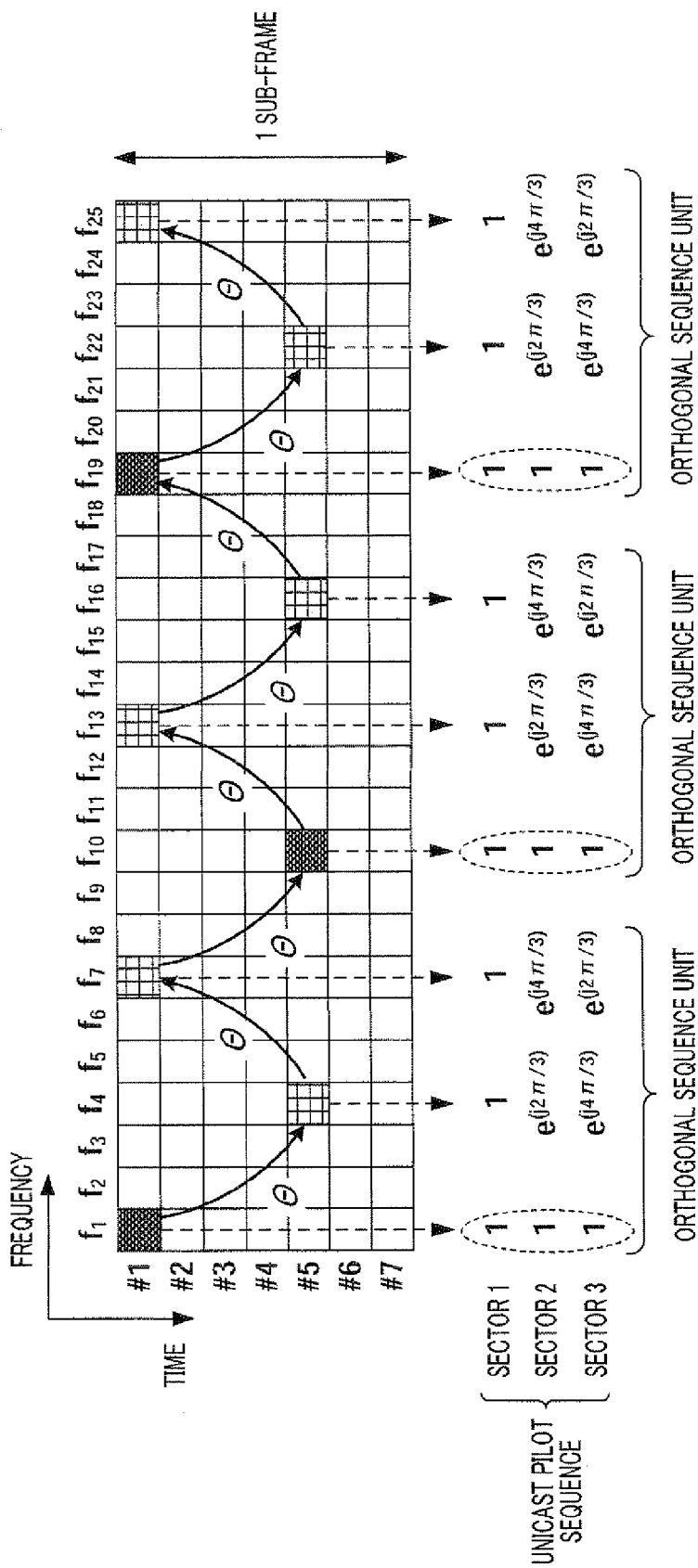
FIG. 7 shows the unicast pilot sequences (in cases of three-sector configuration), according to an embodiment of the present invention.

In cases where unicast pilot sequences are set as individual orthogonal pilot sequences between sectors and arranged as described above as shown in FIG. 1, as shown in FIG. 7, the first chip (i.e. head chip) in one orthogonal sequence unit is all "1" in sectors 1 to 3, the unicast pilot "1" of sector 1, the unicast pilot "1" of sector 2 and the unicast pilot "1" of sector 3 are multiplexed on the channel for subcarrier $f_1$ in OFDM symbol #1, subcarrier $f_{10}$ in OFDM symbol #5, and subcarrier $f_{19}$ in OFDM symbol #1. That is, when base station 10 (FIGS. 3 and 4) transmits unicast pilot sequences to sectors, in some of the unicast pilot sequences, the same pilots are transmitted at the same time from a plurality of antennas. In other words, on a two-dimensional plane defined by the frequency domain and the time domain, there are positions where the same pilots are arranged between a plurality of sectors in the pilots in the unicast pilot sequences. Then, the same pilots in unicast pilot sequences transmitted to a plurality of sectors at the same time are also available as multicast pilots.

Then, in the present embodiment, as shown in the following pilot arrangement examples 1 to 8, in one sub-frame, arrangement section 106 (FIG. 5) of radio communication apparatus 100 regards the same pilots between sectors 1 to 3 in the pilots of unicast pilot sequences, as multicast pilots, and, does not arrange the pilots of multicast pilot sequences to different times of the same frequency as the positions where the same pilots are arranged. In cases where multicast data is outputted from separation section 206 to compensation section 209, pilot selection section 207 (FIG. 6) of mobile station 200 further selects a pilot that can be used as a multicast pilot in unicast pilot sequences, and outputs the selected pilot to channel estimation section 208.

In this way, it is possible to maintain the accuracy of channel estimation of both unicast data and multicast data, and reduce the number of multicast pilots. Then, it is possible to arrange data to the positions where the reduced multicast pilots have been arranged, so that resources for data use can increase.

Hereinafter, pilot arrangement examples 1 to 5 in arrangement section 106 (FIG. 5) will be explained in cases where one cell is divided into three sectors, that is, sectors 1 to 3.

PILOT ARRANGEMENT EXAMPLE 1 (FIG. 8)

Figure 1:
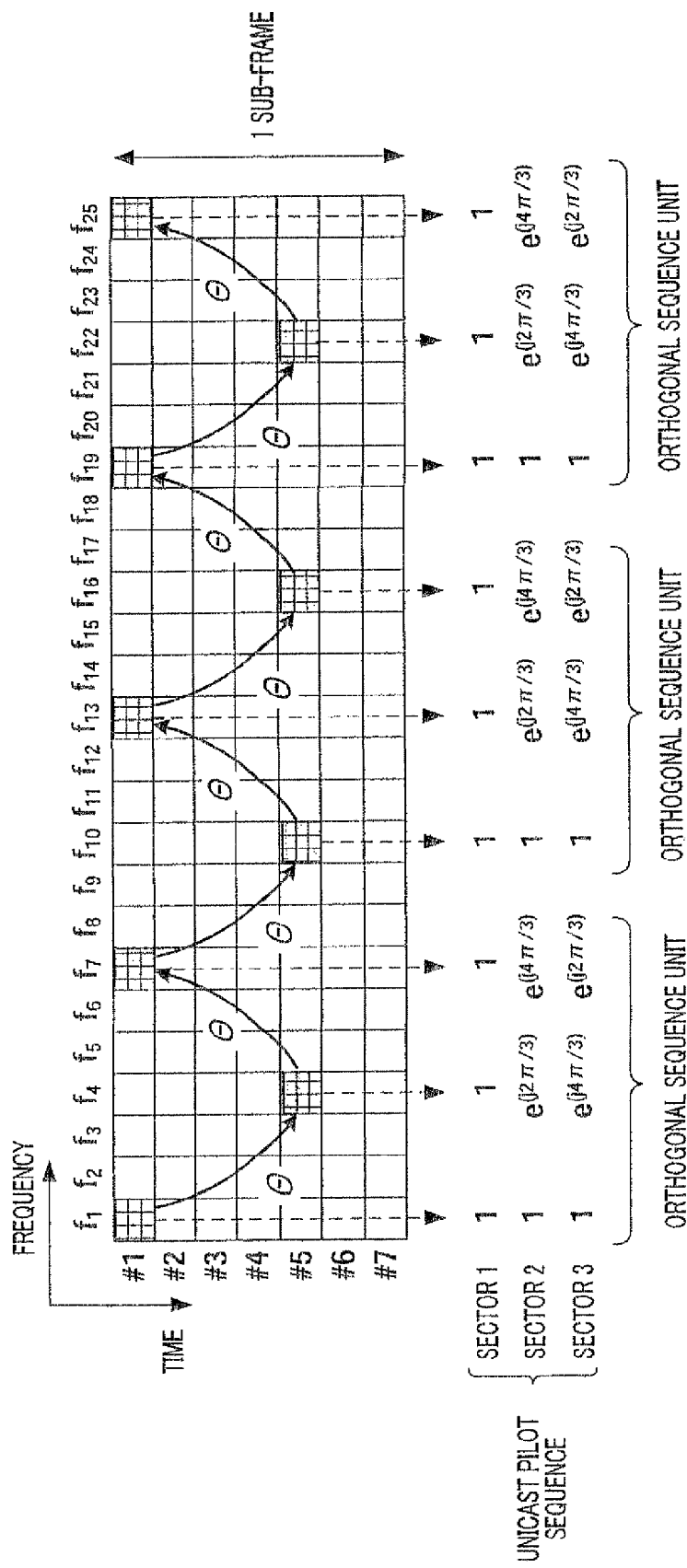
FIG. 1 shows a conventional unicast pilot arrangement.
Figure 2:
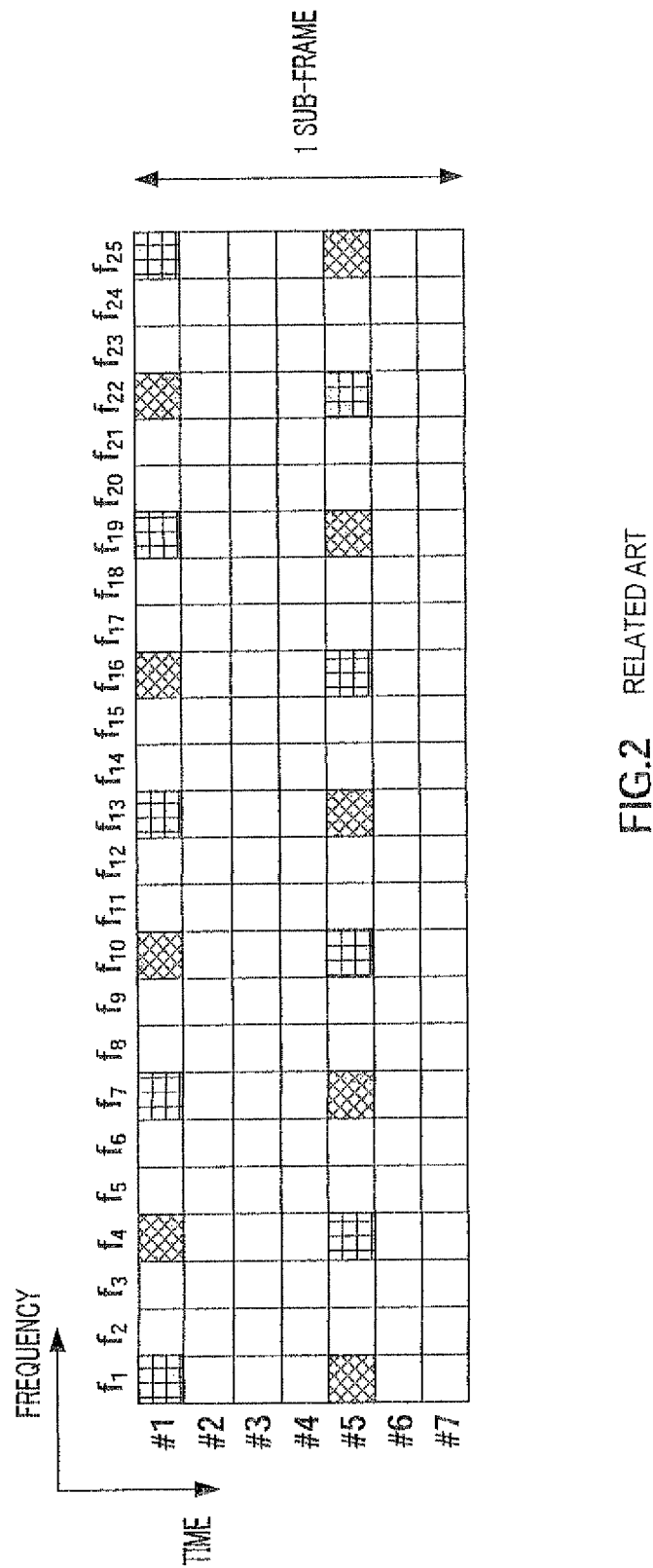
FIG. 2 shows a conventional multicast pilot arrangement.
Figure 8:
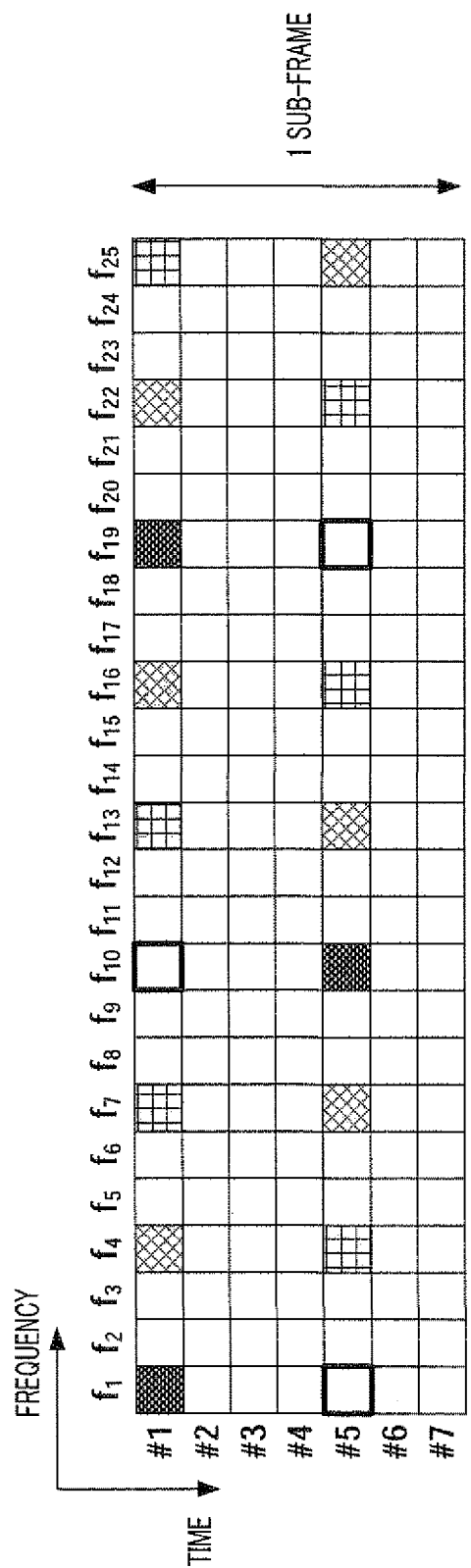
FIG. 8 shows pilot arrangement example 1 according to an embodiment of the present invention.

In this arrangement example, as shown in FIG. 8, arrangement section 106 arranges unicast pilots to subcarriers $f_1$, $f_7$, $f_{13}$, $f_{19}$ and $f_{25}$ in OFDM symbol #1 and subcarriers $f_4$, $f_{10}$, $f_{16}$ and $f_{22}$ in OFDM symbol #5 as in FIGS. 1 and 7. Further, arrangement section 106 arranges multicast pilots to subcarriers $f_4$, $f_{16}$ and $f_{22}$ in OFDM symbol #1 and subcarriers $f_7$, $f_{13}$, and $f_{25}$ in OFDM symbol #5. However, as described above, the unicast pilots arranged to subcarriers $f_1$ and $f_{19}$ in OFDM symbol #1 and subcarrier $f_{10}$ in OFDM symbol #5 can be also used as multicast pilots, so that, instead of the multicast pilots, unicast data or multicast data is arranged to subcarriers $f_{10}$ in OFDM symbol #1 and subcarriers $f_1$ and $f_{19}$ in OFDM symbol #5.

In this way, it is possible to arrange pilots that can be used for channel estimation of multicast data at equal intervals (i.e. predetermined periods) in the frequency domain and reduce the number of multicast pilots in one sub-frame. Consequently, it is possible to maintain the accuracy of channel estimation for multicast data in the frequency domain, and to reduce the number of multicast pilots and increase resources for data use.

PILOT ARRANGEMENT EXAMPLE 2 (FIG. 9)

Figure 9:
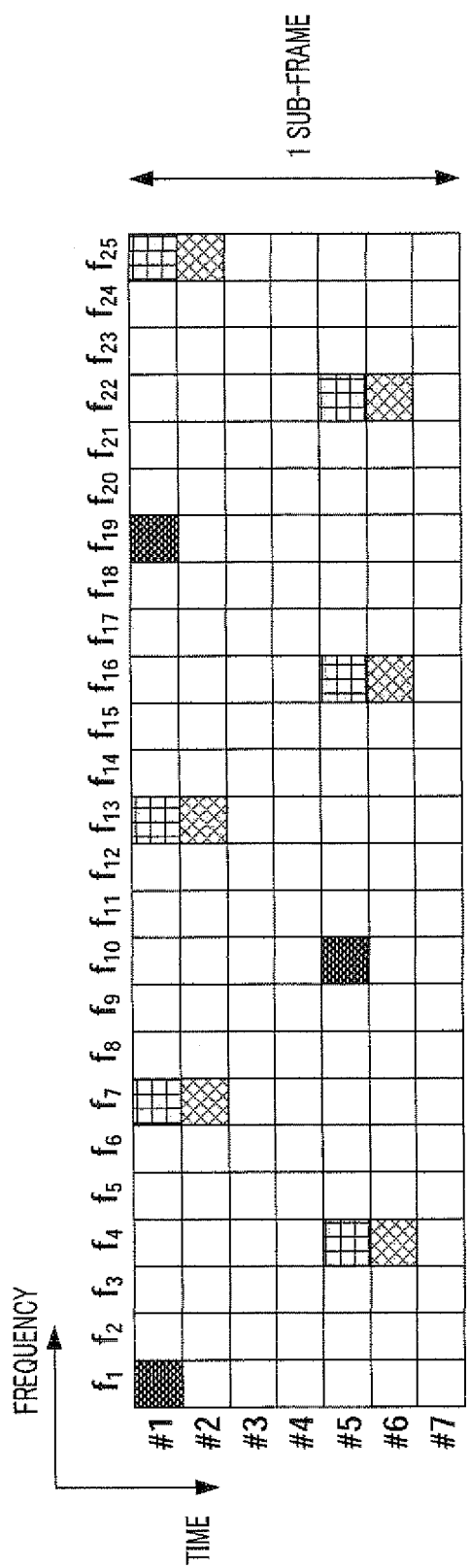
FIG. 9 shows pilot arrangement example 2 according to an embodiment of the present invention.

This arrangement example differs from arrangement example 1 (FIG. 8) in that arrangement section 106 arranges multicast pilots to subcarriers $f_7$, $f_{13}$ and $f_{25}$ in OFDM symbol #2 and to subcarriers $f_4$, $f_{16}$ and $f_{22}$ in OFDM symbol #6 as shown in FIG. 9.

In this way, it is possible to arrange pilots that can be used for channel estimation of multicast data at equal intervals (i.e. predetermined periods) in the time domain, in addition to the frequency domain. That is, according to this arrangement example, it is possible to arrange pilots that can be used for channel estimation of multicast data at equal intervals (i.e. predetermined periods) both in the frequency domain and in the time domain, and reduce the number of multicast pilots in one sub-frame. Consequently, compared to arrangement example 1, this arrangement example improves the accuracy of channel estimation for multicast data in the time domain. This arrangement example is especially suitable for use in a case where a mobile station in a cell moves at high speed.

PILOT ARRANGEMENT EXAMPLE 3 (FIG. 10)

Figure 10:
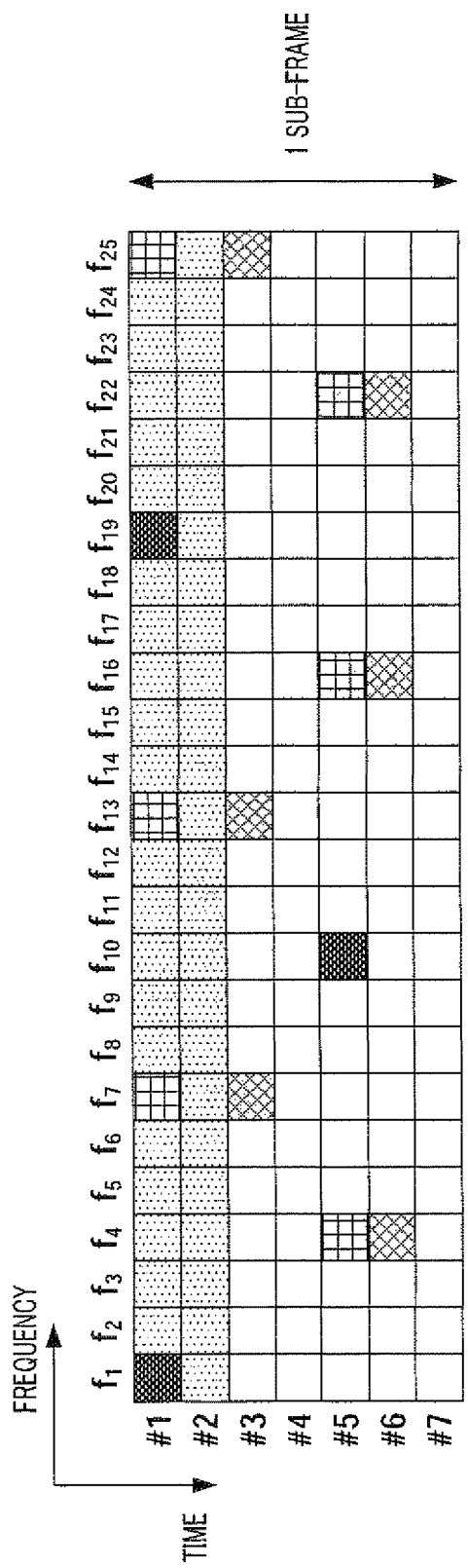
FIG. 10 shows pilot arrangement example 3 according to an embodiment of the present invention.

Multicast pilots are unnecessary to perform channel estimation for dedicated channels per sector. Then, this arrangement example differs from pilot arrangement example 2 (FIG. 9) in that multicast pilots are arranged to areas apart from the areas where dedicated control channels including SCCHs (Shared Control Channels) for each sector of sector 1, sector 2 and sector 3, are arranged in one sub-frame. FIG. 10 shows the area defined by subcarriers $f_1$ to $f_{25}$ (frequency domain) and OFDM symbols #1 and #2 (time domain), as the area where SCCHs are arranged. That is, in this arrangement example, as shown in FIG. 10, multicast pilots are arranged to an area apart from the area defined by subcarriers $f_1$ to $f_{25}$ and OFDM symbols #1 and #2, that is, subcarriers $f_7$, $f_{13}$ and $f_{25}$ in OFDM symbol #3 and subcarriers $f_4$, $f_{16}$ and $f_{22}$ in OFDM symbol #6.

In this way, compared to arrangement example 2, this arrangement example improves the accuracy of channel estimation for multicast channels arranged to areas apart from the areas where dedicated channels (e.g. SCCHs) for each sector are arranged in one sub-frame.

PILOT ARRANGEMENT EXAMPLE 4 (FIG. 11)

Figure 11:
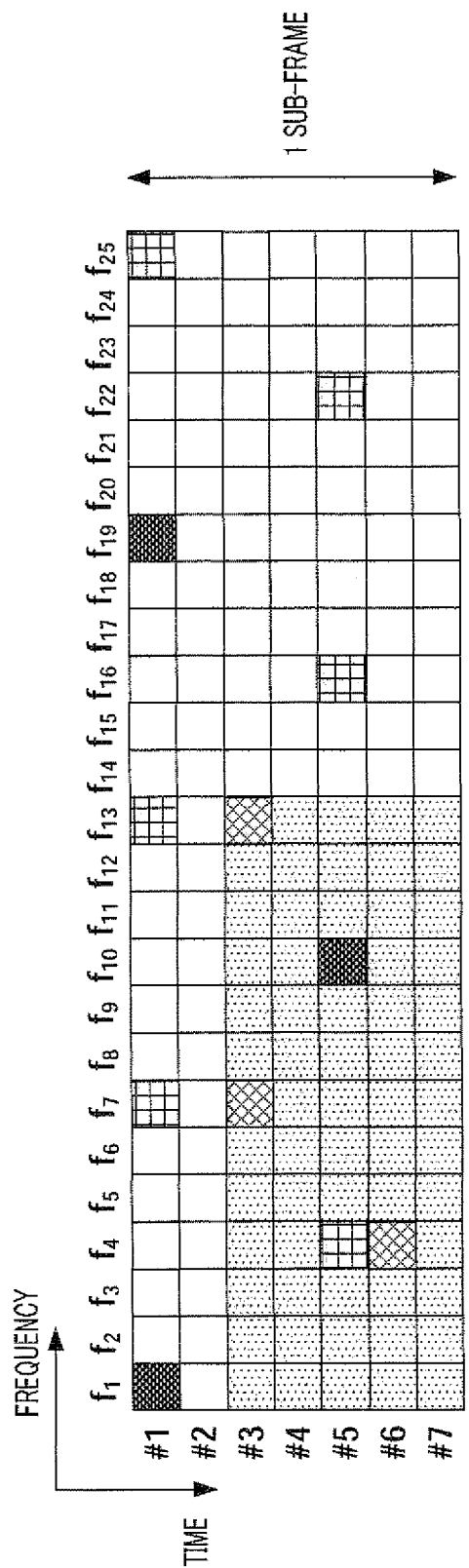
FIG. 11 shows pilot arrangement example 4 according to an embodiment of the present invention.

A multicast pilot is only necessary to perform channel estimation for channels shared between sectors. Then, this arrangement example differs from pilot arrangement example 2 (FIG. 9) in that, in one sub-frame, multicast pilots are arranged to areas where shared channels including PCHs (Paging Channels) and BCHs (Broadcast Channels) between sectors 1 to 3 are arranged. FIG. 11 shows the area defined by subcarriers $f_1$ to $f_{13}$ (frequency domain) and OFDM symbols #3 to #7 (time domain), as the area where PCHs or BCHs are arranged. That is, in this arrangement example, as shown in FIG. 11, multicast pilots are arranged to the area defined by subcarriers $f_1$ to $f_{13}$ and OFDM symbols #3 to #7, that is, subcarriers $f_7$ and $f_{13}$ in OFDM symbol #3 and subcarrier $f_4$ in OFDM symbol #6.

In this way, compared to arrangement example 2, this arrangement example improves the accuracy of channel estimation of shared channels including PCHs and BCHs between sectors.

PILOT ARRANGEMENT EXAMPLE 5 (FIG. 12)

Figure 12:
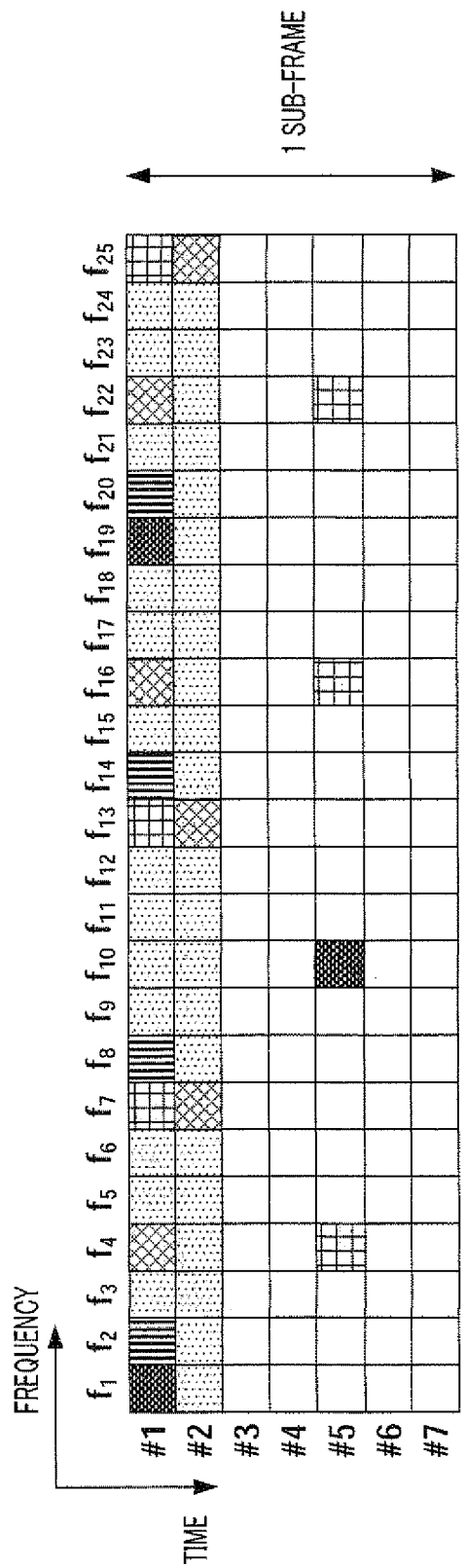
FIG. 12 shows pilot arrangement example 5 according to an embodiment of the present invention.

This arrangement example differs from pilot arrangement example 3 (FIG. 10) in that, in one sub-frame, in a case where shared channels including PCHs and BCHs between sectors 1 to 3 are arranged to the area where dedicated control channels including SCCHs and PDCCHs (i.e. Physical downlink control channels) for each sector of sector 1, sector 2 and sector 3, are arranged, to improve the accuracy of channel estimation for the shared channels, multicast pilots are arranged to the area. To be more specific, in this arrangement example, as shown in FIG. 12, in a case where SCCHs are arranged to the area defined by subcarriers $f_1$ to $f_{25}$ (frequency domain) and OFDM symbols #1 and #2 (time domain) and where paging indicators are arranged to subcarriers $f_2$, $f_8$, $f_{14}$ and $f_{20}$ in OFDM symbol #1, multicast pilots are arranged to subcarriers $f_4$, $f_{16}$ and $f_{22}$ in OFDM symbol #1 and subcarriers $f_7$, $f_{13}$ and $f_{25}$ in OFDM symbol #2.

Figure 13:
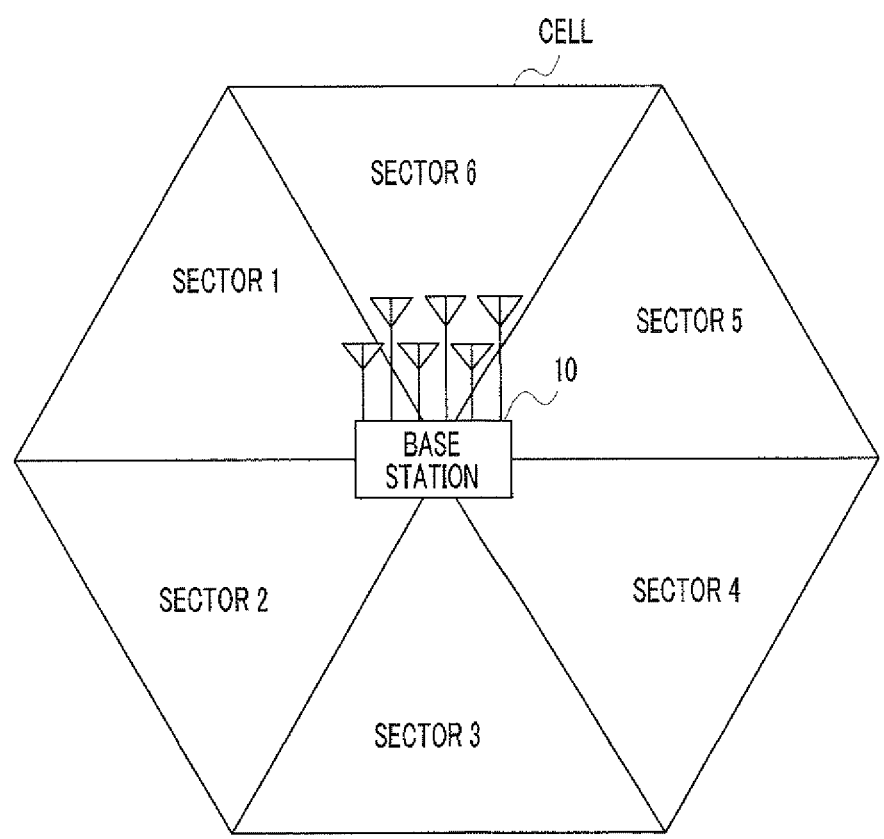
FIG. 13 is a configuration diagram of the mobile communication system (six-sector configuration), according to an embodiment of the present invention.

Next, FIG. 13 shows an arrangement example where one cell is divided into six sectors, that is, sectors 1 to 6.

As shown in FIG. 13, sector 1 neighbors sectors 2 and 6, sector 2 neighbors sectors 1 and 3, sector 3 neighbors sectors 2 and 4, sector 4 neighbors sectors 3 and 5, sector 5 neighbors sectors 4 and 6, and sector 6 neighbors sectors 1 and 5. In this case, base station 10 has six antennas for each sector and transmits signals to each sector from each antenna. That is, base station 10 for six sectors has six radio communication apparatuses 100 shown in FIG. 5 for sectors 1 to 6.

Figure 14:
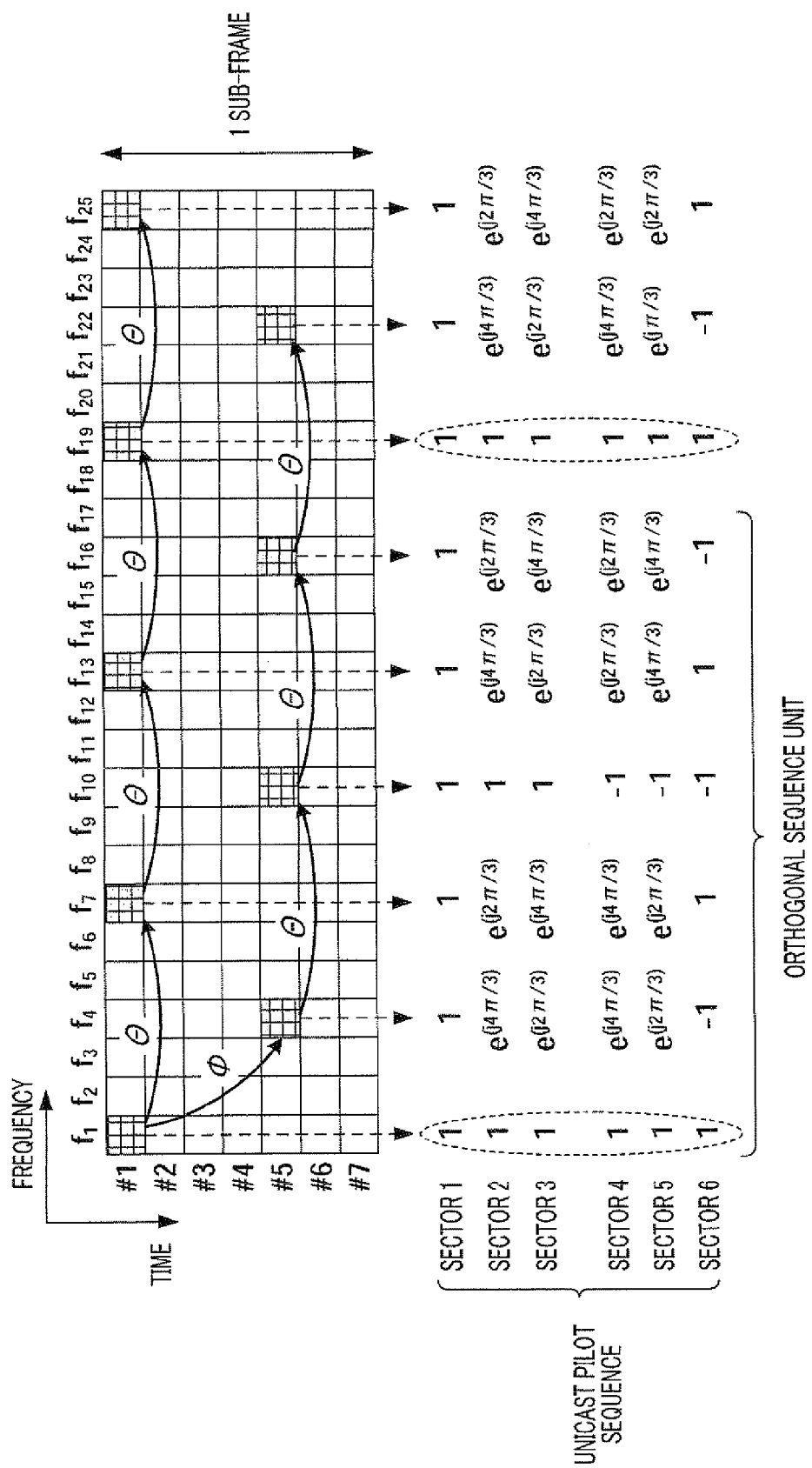
FIG. 14 shows the unicast pilot sequences (in cases of six-sector configuration), according to an embodiment of the present invention.

Further, in a case where one cell is divided into six sectors, that is, sectors 1 to 6, the orthogonal pilot sequences as shown in FIG. 14 are set as unicast pilot sequences for sectors. By this means, the unicast pilot sequences of sectors 1 to 6 are orthogonal to each other in six-chip units (an orthogonal sequence unit) as shown in FIG. 14. Then, in cases of dividing one cell into six sectors, that is, sectors 1 to 6, unicast pilot generation section 105 of radio communication apparatuses 100 (FIG. 5) generates unicast pilot sequences shown in FIG. 14 and outputs them to arrangement section 106.

Then, in a case individual orthogonal pilot sequences varying between sectors are set up as unicast pilot sequences and arranged as shown in FIG. 14, similar to the case of dividing one cell into three sectors, the first chip (i.e. head chip) in one orthogonal sequence unit is all "1" in sectors 1 to 6, and all the unicast pilots "1" are multiplexed on the channel at subcarriers $f_1$ and $f_{19}$ in OFDM symbol #1. That is, similar to the case of dividing one cell into three sectors, when base station 10 (FIG. 13) transmits unicast pilot sequences to sectors, in some of the unicast pilot sequences, the same pilots are transmitted at the same time from a plurality of antennas. Then, as described above, the same pilots in unicast pilot sequences transmitted from a plurality of antennas at the same time are also available as multicast pilots.

Hereinafter, pilot arrangement examples 6 to 8 in arrangement section 106 (FIG. 5) will be explained in cases where one cell is divided into six sectors, that is, sectors 1 to 6.

PILOT ARRANGEMENT EXAMPLE 6 (FIG. 15)

Figure 15:
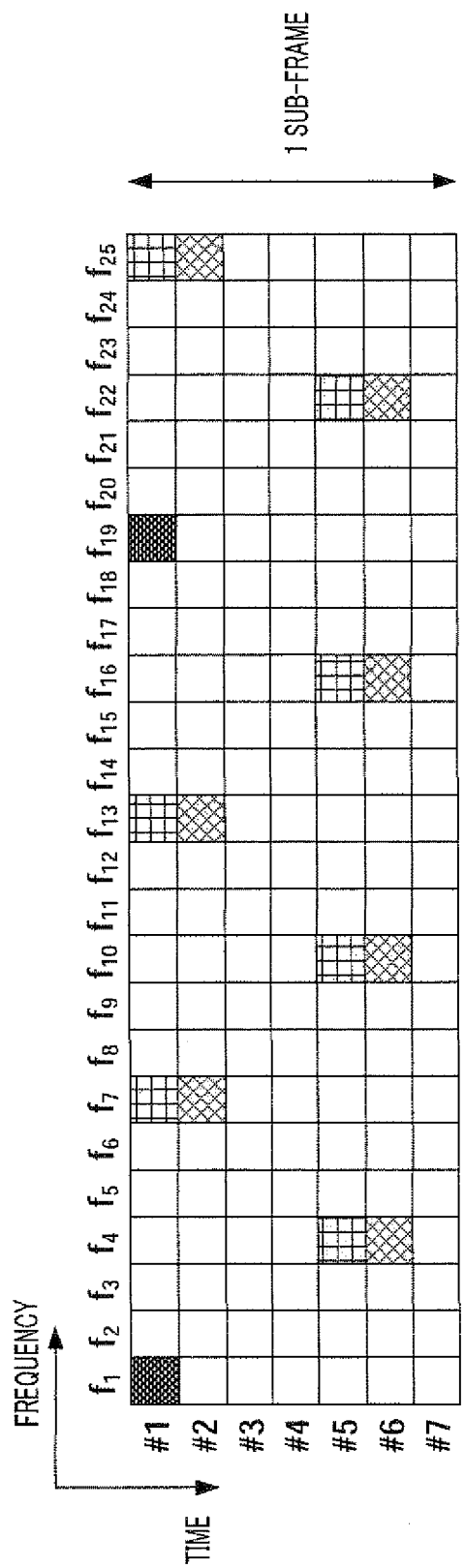
FIG. 15 shows pilot arrangement example 6 according to an embodiment of the present invention.

In this arrangement example, as shown in FIG. 15, arrangement section 106 arranges unicast pilots to subcarriers $f_1$, $f_7$, $f_{13}$, $f_{19}$ and $f_{25}$ in OFDM symbol #1 and subcarriers $f_4$, $f_{10}$, $f_{16}$ and $f_{22}$ in OFDM symbol #5 as in FIG. 14. Further, arrangement section 106 arranges multicast pilots to subcarriers $f_7$, $f_{13}$ and $f_{25}$ in OFDM symbol #2 and subcarriers $f_4$, $f_{10}$, $f_{16}$ and $f_{22}$ in OFDM symbol #6. However, as described above, the unicast pilots arranged to subcarriers $f_1$ and $f_{19}$ in OFDM symbol #1 can be also used as multicast pilots, so that, instead of the multicast pilots, unicast data or multicast data is arranged to subcarriers $f_1$ and $f_{19}$ in OFDM symbol #2.

By this means, only if one cell is divided into six sectors, it is possible to reduce the number of multicast pilots in one sub-frame and arrange pilots that can be used for channel estimation of multicast data at equal intervals (i.e. predetermined periods) both in the frequency domain and in the time domain.

PILOT ARRANGEMENT EXAMPLE 7 (FIGS. 16 to 19)

Figure 16:
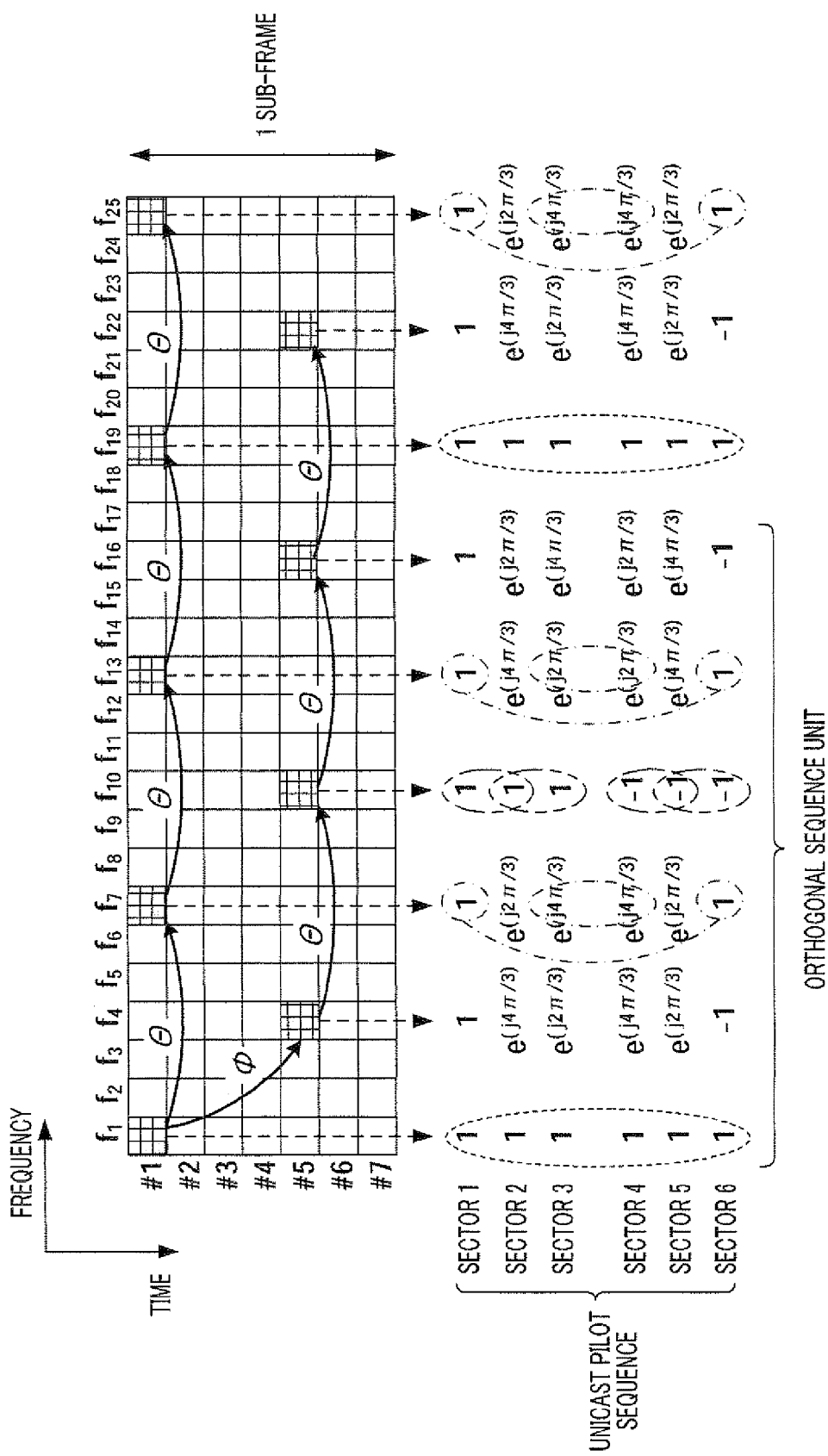
FIG. 16 shows the unicast pilot sequences (in cases of six-sector configuration), according to an embodiment of the present invention.

In the case where one cell is divided into six sectors, that is, sectors 1 to 6, as shown in FIG. 13, there are sector boundaries between sector 1 and 2 (i.e. sector boundary 1), between sector 2 and 3 (i.e. sector boundary 2), between sector 3 and 4 (i.e. sector boundary 3), between sector 4 and 5 (i.e. sector boundary 4), between sector 5 and 6 (i.e. sector boundary 5) and between sector 6 and 1 (i.e. sector boundary 6). That is, mobile station 200 (FIG. 6) located in the sector boundary receives multicast data of two sectors in a mixed manner. That is, as shown in FIG. 16, available pilots as multicast pilots in unicast pilot sequences can be classified into the available pilots as multicast pilots at all sector boundaries of sector boundaries 1 to 6, the available pilots as multicast pilots at sector boundaries 3 and 6, and the available pilots as multicast pilots at sector boundaries 1, 2, 4 and 5.

Figure 17:
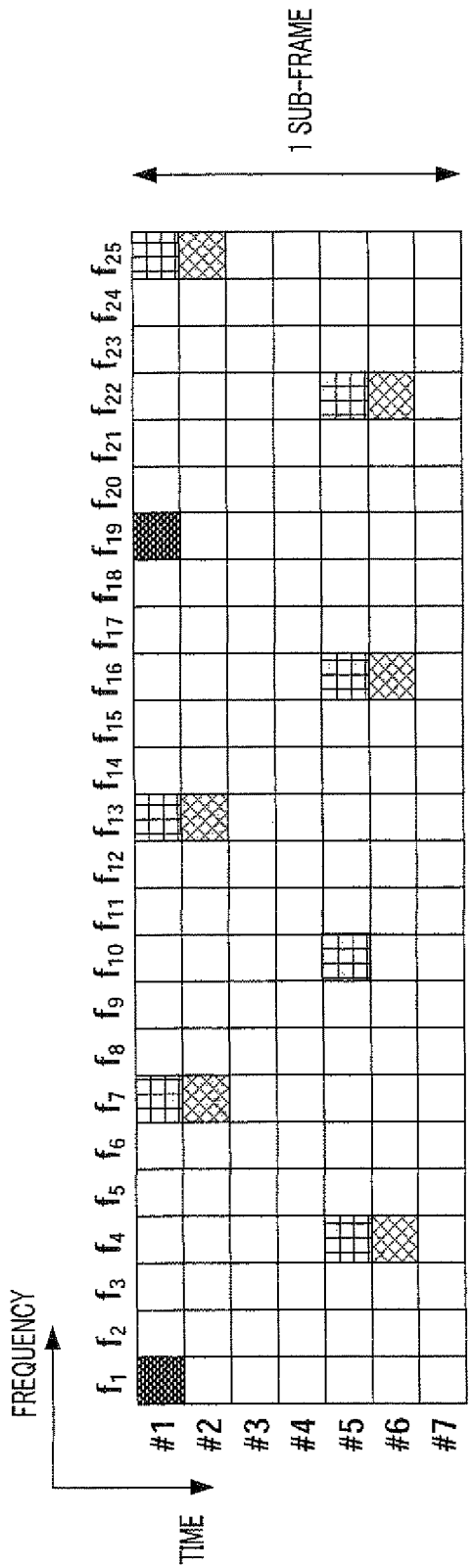
FIG. 17 shows pilot arrangement example 7 according to an embodiment of the present invention.
Figure 18:
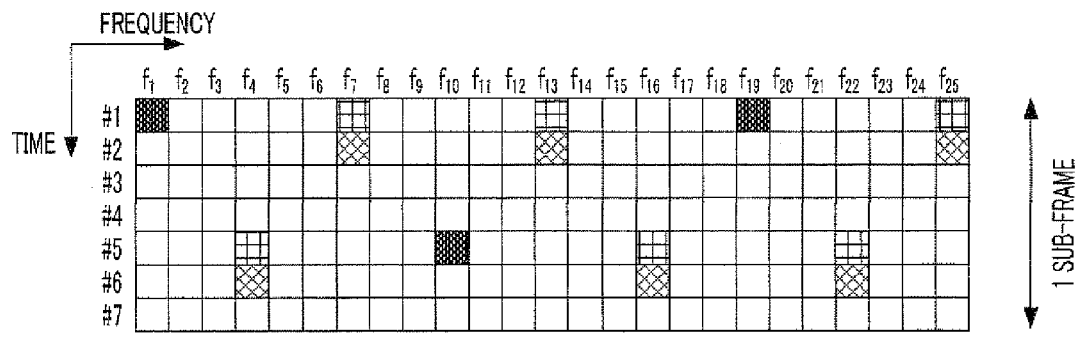
FIG. 18 shows pilot use example 1 in pilot arrangement example 7 according to an embodiment of the present invention.

Then, this arrangement example adopts the pilot arrangement showing in FIG. 17. This arrangement example differs from arrangement example 6 (FIG. 15) in that a multicast pilot is not arranged to subcarrier $f_{10}$ in OFDM symbol #6. By this means, it is possible to reduce the number of multicast pilots further.

In cases where pilots are arranged as such, in mobile station 200 located in sector boundary 1, 2, 4 or 5, as shown in FIG.

Figure 19:
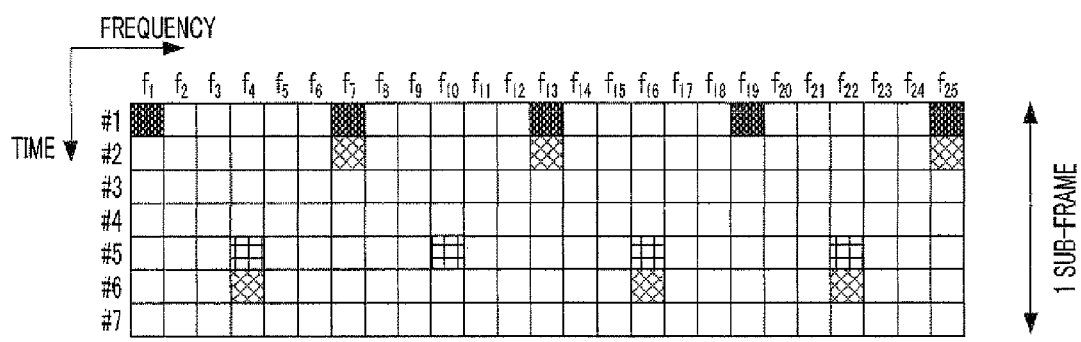
FIG. 19 shows pilot use example 2 in pilot arrangement example 7 according to an embodiment of the present invention.
Figure 20:
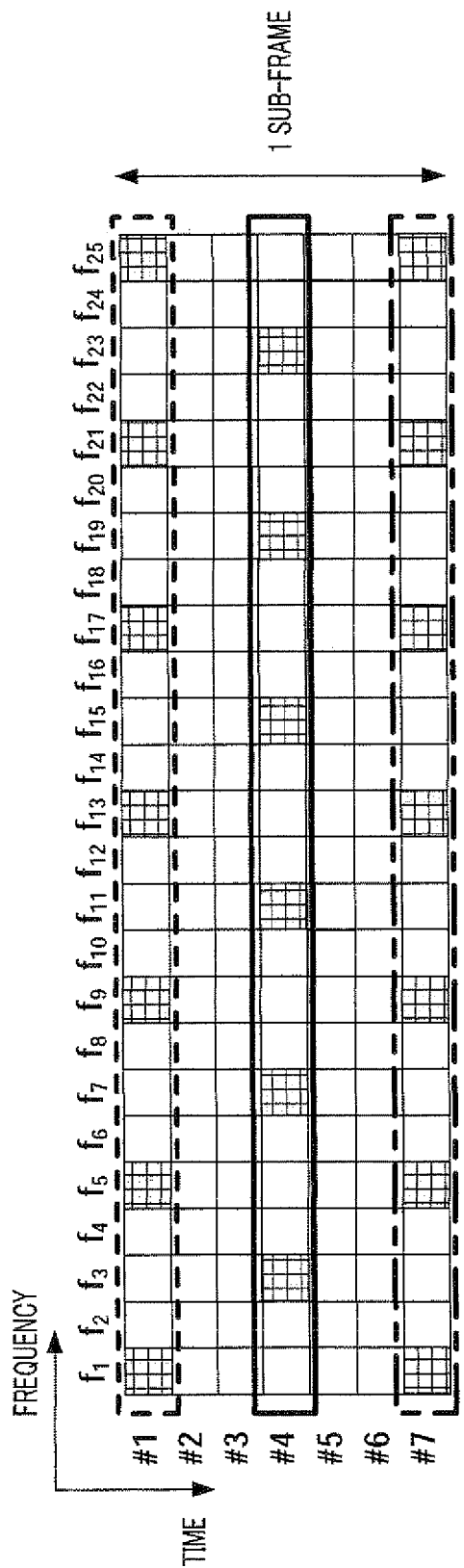
FIG. 20 shows pilot arrangement example 8 according to an embodiment of the present invention.

18, unicast pilots arranged to subcarriers $f_1$ and $f_{19}$ in OFDM symbol #1 and subcarrier $f_{10}$ in OFDM symbol #5 can be also used as multicast pilots. Further, in mobile station 200 located in sector boundary 3 or 6, as shown in FIG. 19, unicast pilots arranged to subcarriers $f_1$, $f_7$, $f_{13}$, $f_{19}$ and $f_{25}$ in OFDM symbol #1 can be also used as multicast pilots.

PILOT ARRANGEMENT EXAMPLE 8 (FIGS. 20 to 26)

In arrangement example 7, the number of unicast pilots also available as multicast pilots varies depending on which sector boundary mobile station 200 is located in. To be more specific, the number of unicast pilots is three (FIG. 18) in mobile station 200 located in sector boundary 1, 2, 4 or 5, and, meanwhile, the number of unicast pilots is five (FIG. 19) in mobile station 200 located in sector boundary 3 or 6.

However, to maintain the accuracy of channel estimation for multicast data regardless of which cell boundary mobile station 200 is located in, the number of unicast pilots also available as multicast pilots is preferably the same regardless of which cell boundary mobile station 200 is located in.

Then, in this arrangement example, as shown in FIGS. 20 to 23, unicast pilot sequences are arranged with rotation on a per OFDM symbol basis between sectors. To be more specific, FIG. 21 shows the unicast pilot sequence arranged to subcarriers $f_1$, $f_5$, $f_9$, $f_{13}$, $f_{17}$, $f_{21}$ and $f_{25}$ in OFDM symbol #1 (unicast pilot sequence 1), FIG. 22 shows the unicast pilot sequence arranged to subcarriers $f_3$, $f_7$, $f_{11}$, $f_{15}$, $f_{19}$ and $f_{23}$ in OFDM symbol #4 (unicast pilot sequence 2), and FIG. 23 shows the unicast pilot sequence arranged to subcarriers f1, $f_5$, $f_9$, $f_{13}$, $f_{17}$, $f_{21}$ and $f_{25}$ in OFDM symbol #7 (unicast pilot sequence 3).

Figure 24:
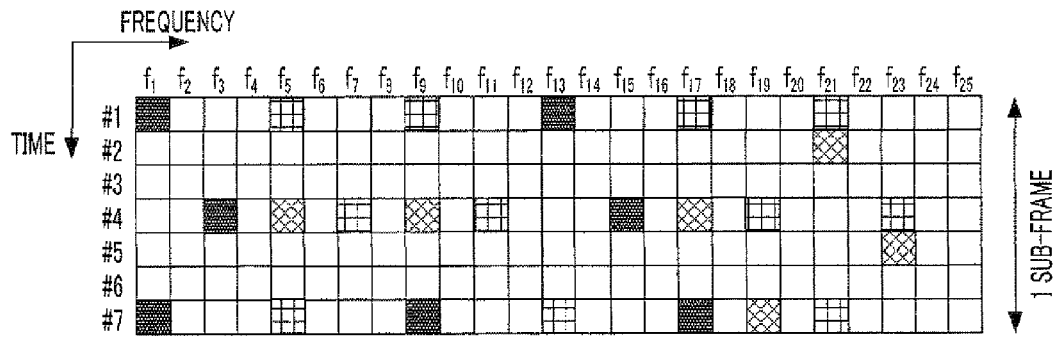
FIG. 24 shows pilot use example 1 in pilot arrangement example 8 according to an embodiment of the present invention.
Figure 25:
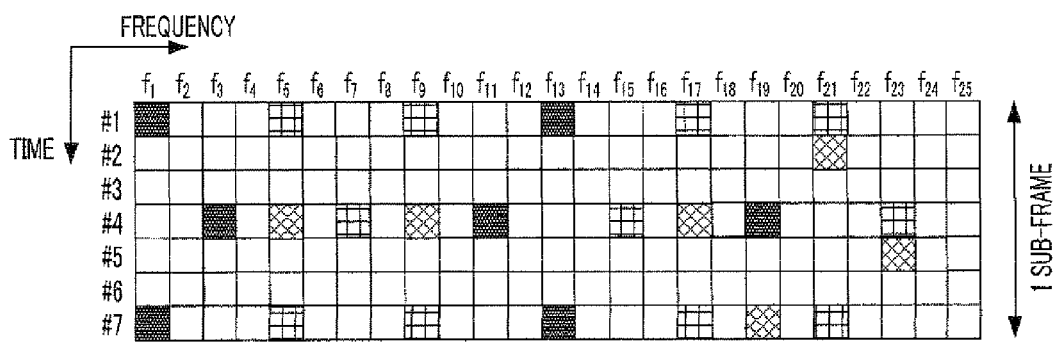
FIG. 25 shows pilot use example 2 in pilot arrangement example 8 according to an embodiment of the present invention.
Figure 26:
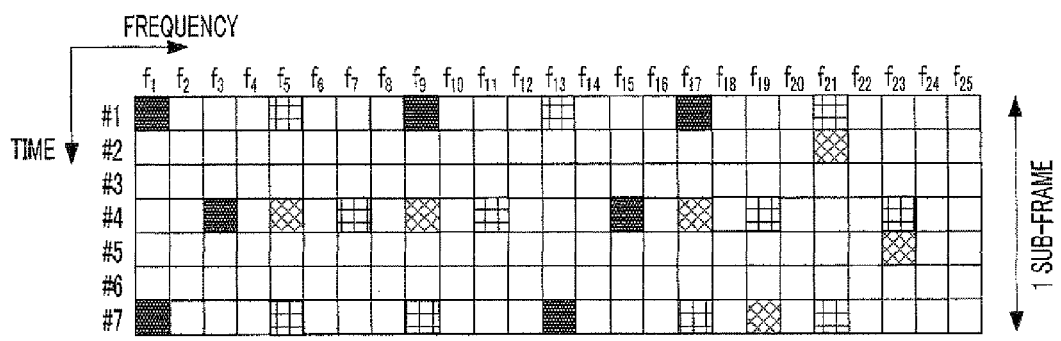
FIG. 26 shows pilot use example 3 in pilot arrangement example 8 according to an embodiment of the present invention.

In cases where these unicast pilots are arranged, in mobile station 200 located in sector boundary 1 or 4, as shown in FIG. 24, unicast pilots arranged to subcarriers $f_1$ and $f_{13}$ in OFDM symbol #1, subcarriers $f_3$ and $f_{15}$ in OFDM symbol #4 and subcarriers $f_1$, $f_9$ and $f_{17}$ in OFDM symbol #7 can be also used as multicast pilots. Further, in mobile station 200 located in sector boundary 2 or 5, as shown in FIG. 25, unicast pilots arranged to subcarriers $f_1$ and $f_{13}$ in OFDM symbol #1, subcarriers $f_3$, $f_{11}$, and $f_{19}$ in OFDM symbol #4 and subcarriers $f_1$ and $f_{13}$ in OFDM symbol #7 can be also used as multicast pilots. Further, in mobile station 200 located in sector boundary 3 or 6, as shown in FIG. 26, unicast pilots arranged to subcarriers $f_1$, $f_9$, and $f_7$ in OFDM symbol #1, subcarriers $f_3$ and $f_{15}$ in OFDM symbol #4 and subcarriers $f_1$ and $f_{13}$ in OFDM symbol #7 can be also used as multicast pilots. That is, regardless of which sector boundary mobile station 200 is located in, the number of available unicast pilots as multicast pilot is seven.

In this way, according to this arrangement example, regardless of which sector boundary mobile station 200 is located in, it is possible to equalize the number of available unicast pilots as multicast pilots.

PILOT ARRANGEMENT EXAMPLE 9 (FIG. 27)

Figure 27:
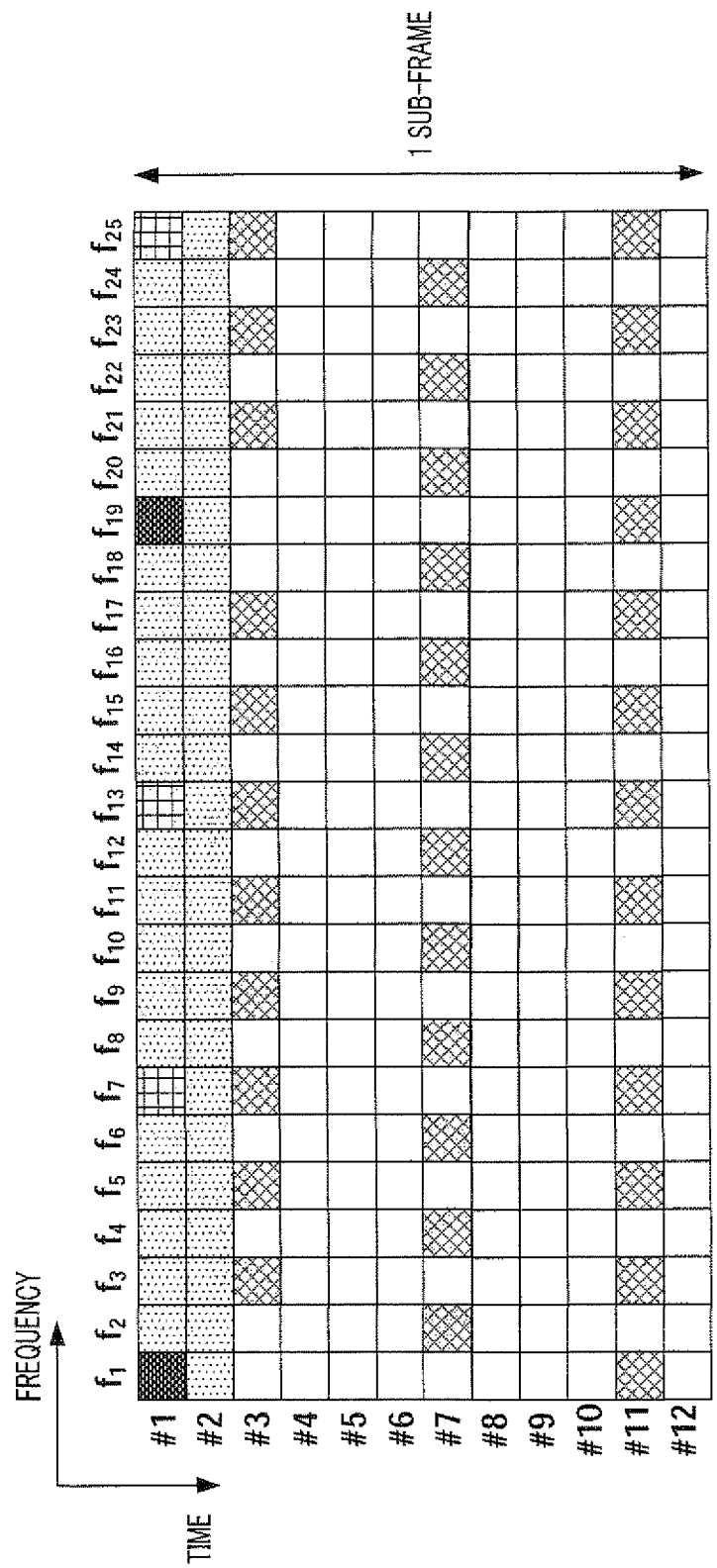
FIG. 27 shows pilot arrangement example 9 according to an embodiment of the present invention.

This arrangement example differs from arrangement example 3 (FIG. 10) in that multicast pilots are arranged to areas apart from the areas where dedicated control channels (e.g. SCCHs and PDCCHs) for each sector of sector 1, sector 2 and sector 3 are arranged, in one sub-frame, and, meanwhile, unicast pilots are arranged to the areas where dedicated control channels for each sector of sector 1, sector 2 and sector 3 are arranged. To be more specific, in this arrangement example, as shown in FIG. 27, in the area defined by subcarriers $f_1$ to $f_{25}$ and OFDM symbols #3 to #12, a multicast pilot is not arranged to subcarriers $f_1$ and $f_{19}$ in OFDM symbol #3.

According to this arrangement example, it is possible to arrange pilots that can be used for channel estimation of multicast data at equal intervals (i.e. predetermined periods) in the frequency domain and reduce the number of multicast pilots in one sub-frame.

An embodiment of the present invention has been explained.

Although cases have been explained above as one example where one cell is divided into three sectors or six sectors, the present invention is not limited to this, and the present invention can also be implemented in cases of any number of sectors.

Further, although cases have been explained with the present embodiment above where the present invention is implemented between sectors, the present invention may be also implemented between cells. In cases where the present invention is implemented between cells, the present invention adopts a configuration adding multicast pilot generating section 150 to each configuration shown in FIG. 5 of the base station assigned to a cell.

Further, by reading "multicast" used in the above description as "broadcast," the present invention may be implemented in a mobile communication system where broadcast data and unicast data are multiplexed. Further, by reading "multicast" used in the above description as "MBMS," the present invention may be implemented in a mobile communication system where MBMS data and unicast data are multiplexed.

Further, the present invention may also be implemented using shared channels between a plurality of sectors, other than multicast channels including PCHs and BCHs.

Further, the sub-frame used in the above description may also be another transmission time unit, for example, a time slot or a frame. Furthermore, the sub-frame may also be a unit of the time period for a constant fading fluctuation, that is, a unit of coherence time, calculated from the highest speed of a mobile station assumed in mobile communication systems.

Further, a pilot used in the above description may also be referred to as a "reference signal." Further, a multicast pilot may also referred to as a "MBSFN reference signal (Multicast/Broadcast Single Frequency Network Reference signal)."

Further, a unicast pilot sequence used in the above description may be a different pilot sequence for each mobile station, and, a different pilot sequence for each sector, that is, a pilot sequence that are common between a plurality of mobile stations located in one sector. Further, a different pilot sequence for each mobile station may be referred to as a "UE-specific reference signal," and a different pilot sequence for each sector may be referred to as a "cell-specific reference signal."

Further, a multicast channel may be referred to as a "SFN channel."

Further, a CP used in the above description may be referred to as a "GI (Guard Interval)." Further, a subcarrier may be referred to as "tone." Further, a base station may be referred to as "Node-B," and a mobile station may be referred to as "UE."

Moreover, although with the above embodiment a case has been described where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-259633, filed on Sep. 25, 2006, including the specification, drawings and abstract, is incorporated herein by reference in its entirety.

INDUSTRIAL APPLICABILITY

The present invention is applicable to, for example, mobile communication systems.

The invention claimed is:

1. A radio communication apparatus comprising:
an arrangement section that arranges a first unicast-pilot sequence that is specific to one of a plurality of sectors or to one of a plurality of cells, a second unicast-pilot sequence that is specific to another of the plurality of sectors or to another of the plurality of cells, and a multicast-pilot sequence that is common between the plurality of sectors or between the plurality of cells, to positions in a frequency domain and a time domain, each of the first unicast-pilot sequence, the second unicast-pilot sequence and the multicast-pilot sequence being comprised of a plurality of pilots; and
a transmission section that transmits the arranged first unicast-pilot sequence, the arranged second unicast-pilot sequence and the arranged multicast-pilot sequence,
wherein, in one sub-frame, the arrangement section arranges a first pilot in the first unicast-pilot sequence and a second pilot in the second unicast-pilot sequence to a same frequency, the first pilot and the second pilot having a same value, and arranges the multicast-pilot sequence to frequencies other than the same frequency, to which the first pilot in the first unicast-pilot sequence and the second pilot in the second unicast-pilot sequence are arranged.

2. The radio communication apparatus according to claim 1, wherein, the other sector or the other cell is a neighboring sector or cell.

3. The radio communication apparatus according to claim 1, wherein, in the sub-frame, the arrangement section arranges the multicast-pilot sequence to areas other than areas where a dedicated channel to a sector or a cell is arranged.

4. The radio communication apparatus according to claim 1, wherein, in the sub-frame, the arrangement section arranges the multicast-pilot sequences to areas where a shared channel between the plurality of sectors or the plurality of cells is arranged.

5. A radio communication base station apparatus comprising the radio communication apparatus according to claim 1.

6. A pilot arrangement method in a mobile communication system comprising:
arranging a first unicast-pilot sequence that is specific to one of a plurality of sectors or one of a plurality of cells, and a second unicast-pilot sequence that is specific to another of the plurality of sectors or to another of the plurality of cells; and
arranging a multicast-pilot sequence that is common between the plurality of sectors or between the plurality of cells, to positions in frequency domain and a time domain, each of the first unicast-pilot sequence, the second unicast-pilot sequence and the multicast-pilot sequence being comprised of a plurality of pilots,
wherein, in one sub-frame, a first pilot in the first unicast-pilot sequence and a second pilot in the second unicast-pilot sequence are arranged to a same frequency, the first pilot and the second pilot having a same value, and the multicast-pilot sequence is arranged to frequencies other than the same frequency, to which the first pilot in the first unicast-pilot sequence and the second pilot in the second specific unicast-pilot sequence are arranged.

* * * * *